United States Patent
Sato

(10) Patent No.: US 12,152,143 B2
(45) Date of Patent: Nov. 26, 2024

(54) CURABLE COMPOSITION AND CURED PRODUCT

(71) Applicant: KANEKA CORPORATION, Osaka (JP)

(72) Inventor: Akinori Sato, Takasago (JP)

(73) Assignee: KANEKA CORPORATION, Osaka (JP)

( * ) Notice: Subject to any disclaimer, the term of this patent is extended or adjusted under 35 U.S.C. 154(b) by 710 days.

(21) Appl. No.: 17/481,520

(22) Filed: Sep. 22, 2021

(65) Prior Publication Data

US 2022/0002541 A1 Jan. 6, 2022

Related U.S. Application Data

(63) Continuation of application No. PCT/JP2020/012224, filed on Mar. 19, 2020.

(30) Foreign Application Priority Data

Mar. 28, 2019 (JP) ................. 2019-062765

(51) Int. Cl.
*C08L 71/02* (2006.01)
*C08L 33/04* (2006.01)

(52) U.S. Cl.
CPC .............. *C08L 71/02* (2013.01); *C08L 33/04* (2013.01); *C08L 2312/00* (2013.01)

(58) Field of Classification Search
CPC .......... C08L 71/02; C08L 43/04; C08L 33/12; C08F 220/14; C08F 220/1818; C08F 220/04; C08F 230/085; C08F 220/08
See application file for complete search history.

(56) References Cited

U.S. PATENT DOCUMENTS

2007/0021563 A1 1/2007 Kasai et al.
2011/0098410 A1* 4/2011 Harumashi .......... C09D 171/02
 525/100
2013/0150530 A1 6/2013 Fujimoto et al.
2013/0217828 A1 8/2013 Miyafuji et al.
2013/0281632 A1* 10/2013 Yano .................... C08G 65/336
 525/407
2016/0108235 A1* 4/2016 Miyafuji ........... C08F 220/1804
 524/425
2017/0107374 A1* 4/2017 Harumashi ............. C08L 33/04
2018/0223139 A1 8/2018 Miyafuji

FOREIGN PATENT DOCUMENTS

| | | |
|---|---|---|
| CN | 103068922 A | 4/2013 |
| EP | 3165572 A1 | 5/2017 |
| JP | 2003-313418 A | 11/2003 |
| JP | 2017-066349 A | 4/2017 |
| WO | 2004/090035 A1 | 10/2004 |
| WO | 2011/152002 A1 | 12/2011 |
| WO | 2017/057719 A1 | 4/2017 |

OTHER PUBLICATIONS

International Search Report issued in corresponding International Patent Application No. PCT/JP2020/012224 dated Jun. 9, 2020 (7 pages).
Written Opinion issued in corresponding International Patent Application No. PCT/JP2020/012224 dated Jun. 9, 2020 (4 pages).

* cited by examiner

*Primary Examiner* — Eli D. Strah
(74) *Attorney, Agent, or Firm* — Osha Bergman Watanabe & Burton LLP

(57) ABSTRACT

A curable composition containing a polyoxyalkylene polymer (A) having a reactive silyl group and a (meth)acrylic ester polymer (B) having a reactive silyl group is provided. In the polyoxyalkylene polymer (A), an average ratio per molecule of a number of reactive silyl groups to a number of ends of a polymer backbone is 0.80 or more. In the (meth)acrylic ester polymer (B), an average number per molecule of the reactive silyl groups bonded at ends of a polymer backbone is from 0.30 to 1.00, and the average number per molecule of the reactive silyl groups bonded inside the polymer backbone is from 0 to less than 0.30.

8 Claims, No Drawings

CURABLE COMPOSITION AND CURED PRODUCT

TECHNICAL FIELD

One or more embodiments of the present invention relate to a curable composition and a cured product.

BACKGROUND

An organic polymer having a silicon-containing group that has a hydroxy or hydrolyzable group attached to a silicon atom and that is capable of forming a siloxane bond (the silicon-containing group will be referred to as a "reactive silyl group" hereinafter) is known as a moisture-reactive polymer. This kind of polymer is contained in many industrial products such as adhesives, sealing materials, coating materials, paints, and pressure-sensitive adhesives and used in a wide variety of fields.

In particular, a curable composition which is a blend of a polyoxyalkylene polymer having a reactive silyl group and a (meth)acrylic ester polymer having a reactive silyl group is known as a composition for use in weather-resistant sealing materials and elastic adhesives (see Patent Literatures 1 to 4, for example).

Patent Literature

PTL 1: WO 2011/152002
PTL 2: WO 2017/057719
PTL 3: Japanese Laid-Open Patent Application Publication No. 2017-066349
PTL 4: Japanese Laid-Open Patent Application Publication No. 2003-313418

SUMMARY

A cured product formed from a curable composition which is a blend of a polyoxyalkylene polymer having a reactive silyl group and a (meth)acrylic ester polymer having a reactive silyl group could exhibit a high strength but be unsatisfactory in terms of elongation.

In view of the above circumstances, one or more embodiments of the present invention aim to provide a curable composition containing a polyoxyalkylene polymer having a reactive silyl group and a (meth)acrylic ester polymer having a reactive silyl group, the curable composition being processable into a cured product that has a high strength and at the same exhibits a high elongation.

As a result of intensive studies, the present inventors have found that the problem can be solved when the following requirements are met: in the polyoxyalkylene polymer, the average ratio per molecule of the number of the reactive silyl groups to the number of ends of the polymer backbone is in a predetermined range; and in the (meth)acrylic ester polymer (B), the average number per molecule of the reactive silyl groups present at ends of the polymer backbone and the average number per molecule of the reactive silyl groups present inside the polymer backbone are in predetermined ranges. Based on this finding, the inventors have arrived at one or more embodiments of the present invention.

Specifically, one or more embodiments of the present invention relate to a curable composition containing: a polyoxyalkylene polymer (A) having a reactive silyl group represented by the following formula (1): —SiR$^1_a$X$_{3-a}$ (1), wherein R$^1$ represents a substituted or unsubstituted hydrocarbon group having 1 to 20 carbon atoms, X represents a hydroxy group or a hydrolyzable group, and a is 0, 1, or 2, and wherein when there are two or more R$^1$ or X groups, the R$^1$ or X groups may be the same or different; and a (meth)acrylic ester polymer (B) having a reactive silyl group represented by the following formula (2): —SiR$^2_b$Y$_{3-b}$ (2), wherein R$^2$ represents an unsubstituted hydrocarbon group having 1 to 20 carbon atoms, Y represents a hydroxy group or a hydrolyzable group, and b is 0, 1, or 2, and wherein when there are two or more R$^2$ or Y groups, the R$^2$ or Y groups may be the same or different, wherein in the polyoxyalkylene polymer (A), the average ratio per molecule of the number of the reactive silyl groups to the number of ends of a polymer backbone is 0.80 or more, and wherein in the (meth)acrylic ester polymer (B), the average number per molecule of the reactive silyl groups bonded at ends of a polymer backbone is from 0.30 to 1.00, and the average number per molecule of the reactive silyl groups bonded inside the polymer backbone is from 0 to less than 0.30. In the polyoxyalkylene polymer (A), the average ratio per molecule of the number of the reactive silyl groups to the number of the ends of the polymer backbone may be 0.85 or more. In the (meth)acrylic ester polymer (B), the average number per molecule of the reactive silyl groups bonded at the ends of the polymer backbone may be from 0.85 to 1.00. In the (meth)acrylic ester polymer (B), the average number per molecule of the reactive silyl groups bonded inside the polymer backbone may be from 0 to less than 0.15. The polyoxyalkylene polymer (A):(meth)acrylic ester polymer (B) weight ratio may be from 80:20 to 50:50. The proportion of methyl methacrylate units in structural monomer units of the (meth)acrylic ester polymer (B) may be from 35 to 85% by weight. The proportion of alkyl methacrylate units in structural monomer units of the (meth)acrylic ester polymer (B) may be from 70 to 85% by weight, and the alkyl of the alkyl methacrylate units is an unsubstituted alkyl group having 1 to 4 carbon atoms. One or more embodiments of the present invention further relate to a cured product produced by curing the curable composition.

One or more embodiments of the present invention can provide a curable composition containing a polyoxyalkylene polymer having a reactive silyl group and a (meth)acrylic ester polymer having a reactive silyl group, the curable composition being processable into a cured product that has a high strength and at the same time exhibits a high elongation.

DETAILED DESCRIPTION

Hereinafter, one or more embodiments of the present invention will be described in detail.

(Polyoxyalkylene Polymer (A))

The curable composition of one or more embodiments of the present invention contains a polyoxyalkylene polymer (A) having a reactive silyl group. By virtue of having the reactive silyl group, the polyoxyalkylene polymer (A) exhibits curability based on hydrolysis and dehydration condensation of the reactive silyl group.

The polyoxyalkylene polymer (A) includes a polyoxyalkylene polymer backbone and terminal structures bonded to the ends of the polymer backbone. The polymer backbone refers to a polymer main chain made up of oxyalkylene repeating units. The polymer backbone of the polyoxyalkylene polymer (A) may be linear or branched. A linear polymer backbone is preferred in that the cured product of the curable composition exhibits a high elongation, and a branched polymer backbone is preferred in that the cured product of the curable composition has a high strength. A linear polymer backbone can be formed by using an initiator having two hydroxy groups per molecule in polymerization for polymer backbone formation, and a branched polymer backbone can be formed by using an initiator having three or more hydroxy groups per molecule in polymerization for polymer backbone formation.

The polymer backbone may be a polymer backbone consisting solely of oxyalkylene repeating units linked together or a polymer backbone that contains structures derived from the initiator used for polymerization in addition to the oxyalkylene repeating units and that consists solely of the oxyalkylene repeating units and the initiator-derived structures. The oxyalkylene repeating unit refers to a repeating unit of a polyether and may be, for example, an oxyalkylene unit having 2 to 6, or 2 to 4, carbon atoms.

The polyoxyalkylene polymer backbone is not limited to a particular polyoxyalkylene, and examples of the polymer backbone include polyoxyethylene, polyoxypropylene, polyoxybutylene, polyoxytetramethylene, polyoxyethylene-polyoxypropylene copolymer, and polyoxypropylene-polyoxybutylene copolymer. Preferred is polyoxypropylene. One polyoxyalkylene may be used as the polymer backbone, or a combination of two or more polyoxyalkylenes may be used as the polymer backbone.

The terminal structure refers to a moiety that does not contain the oxyalkylene repeating unit of the polyoxyalkylene polymer backbone and that is bonded to an end of the polymer backbone. The terminal structure may be bonded via an oxygen atom to an oxyalkylene unit located at the end of the polymer backbone. The reactive silyl groups of the polyoxyalkylene polymer (A) may be contained in the terminal structures.

In one or more embodiments of the present invention, the polyoxyalkylene polymer (A) contains the reactive silyl groups in a predetermined ratio. Specifically, in the polyoxyalkylene polymer (A), the average ratio per molecule of the number of the reactive silyl groups to the number of the ends of the polymer backbone is 0.80 or more. As a result of combined use of the polyoxyalkylene polymer (A) meeting this requirement and the (meth)acrylic ester polymer (B) described later, the cured product of the curable composition of one or more embodiments of the present invention can exhibit both a high strength and a high elongation. The value of the average ratio can be determined by the method as described in Examples. The value of the average ratio may be determined by a method other than that as described in Examples; for example, the value of the average ratio may be calculated from results of GPC analysis and NMR analysis of the polyoxyalkylene polymer (A).

The average ratio of the number of the reactive silyl groups to the number of the ends of the polymer backbone refers to the average number of the reactive silyl groups per terminal structure of the polymer backbone, and can be expressed as (number of reactive silyl groups per polymer molecule)/(number of ends of polymer backbone per polymer molecule). The number of the ends of the polymer backbone per polymer molecule is 2 in the case where the whole of the polymer backbone is linear and 3 or more in the case where the whole of the polymer backbone is branched. In the case where the polymer backbone is a mixture of linear and branched structures, the number of the ends of the polymer backbone per polymer molecule may be between 2 and 3.

The average ratio of the number of the reactive silyl groups to the number of the ends of the polymer backbone is 0.80 or more. In order for the cured product of the curable composition of one or more embodiments of the present invention to exhibit a higher strength, the average ratio may be 0.85 or more, 0.90 or more, or 0.95 or more. The average ratio may be 1.0 or more, 1.1 or more, 1.3 or more, or 1.5 or more. The ratio may be 5 or less, or 3 or less.

The reactive silyl group of the polyoxyalkylene polymer (A) is represented by the following formula (1).

$$—SiR^1_aX_{3-a} \quad (1)$$

$R^1$ represents a substituted or unsubstituted hydrocarbon group having 1 to 20 carbon atoms. The number of carbon atoms may be from 1 to 10, from 1 to 8, from 1 to 6, from 1 to 3, or 1 or 2. In the case where the hydrocarbon group has a substituent, the substituent is not limited to a particular group. Examples of the substituent include halogen groups such as a chloro group, alkoxy groups such as a methoxy group, and amino groups such as a N,N-diethylamino group.

Examples of $R^1$ include: unsubstituted alkyl groups such as methyl, ethyl, n-propyl, isopropyl, n-butyl, tert-butyl, n-hexyl, 2-ethylhexyl, and n-dodecyl groups; substituted alkyl groups such as chloromethyl, methoxymethyl, and N,N-diethylaminomethyl groups; unsaturated hydrocarbon groups such as vinyl, isopropenyl, and allyl groups; cycloalkyl groups such as a cyclohexyl group; aryl groups such as phenyl, toluyl, and 1-naphthyl groups; and aralkyl groups such as a benzyl group. $R^1$ may be a substituted or unsubstituted alkyl group, a methyl, ethyl, chloromethyl, or methoxymethyl group, or a methyl or methoxymethyl group, or a methyl group. One group may be used as the $R^1$ group, or two or more groups may be used as the $R^1$ groups.

X represents a hydroxy or hydrolyzable group. Examples of X include a hydroxy group, hydrogen, halogens, and alkoxy, acyloxy, ketoximate, amino, amide, acid amide, aminooxy, mercapto, and alkenyloxy groups. The alkoxy groups etc. may have a substituent. In terms of moderate hydrolyzability and ease of handling, alkoxy groups are preferred, methoxy, ethoxy, n-propoxy, and isopropoxy groups are more preferred, methoxy and ethoxy groups are even more preferred, and a methoxy group is particularly preferred. One group may be used as the X group, or two or more groups may be used as the X groups.

In the formula (1), a may be 0, 1, or 2, or 0 or 1. In terms of the balance between the curability of the curable composition and the physical properties of the cured product, a may be 1.

Examples of the reactive silyl group represented by the formula (1) include trimethoxysilyl, triethoxysilyl, tris(2-propenyloxy)silyl, triacetoxysilyl, methyldimethoxysilyl, methyldiethoxysilyl, dimethoxyethyl silyl, (chloromethyl)dimethoxysilyl, (chloromethyl)diethoxysilyl, (methoxymethyl)dimethoxysilyl, (methoxymethyl)diethoxysilyl, (N,N-diethylaminomethyl)dimethoxysilyl, and (N,N-diethylaminomethyl)diethoxysilyl groups. Among these, methyldimethoxysilyl, trimethoxysilyl, triethoxysilyl, (chloromethyl)dimethoxysilyl, (methoxymethyl)dimethoxysilyl, (methoxymethyl)diethoxysilyl, and (N,N-diethylaminomethyl)dimethoxysilyl groups are preferred. In terms of reactivity, trimethoxysilyl, (chloromethyl)dimethoxysilyl, and (methoxymethyl)dimethoxysilyl groups are more preferred. In terms of stability, methyldimethoxysilyl, methyldiethoxysilyl, and triethoxysilyl groups are more preferred. Trimethoxysilyl, triethoxysilyl, and methyldimethoxysilyl groups are more preferred in terms of ease of production. Most preferred is a methyldimethoxysilyl group.

In the polyoxyalkylene polymer (A), the terminal structure having the reactive silyl group is not limited to a particular structure. Typical examples of the terminal structure include terminal structures represented by the formula (3) or (4) given below.

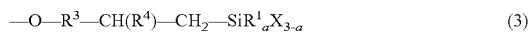

$$—O—R^3—CH(R^4)—CH_2—SiR^1{}_aX_{3-a} \quad (3)$$

In the formula (3), $R^3$ represents a direct bond or a divalent hydrocarbon group having 1 to 4 carbon atoms, and $R^4$ represents hydrogen or an alkyl group having 1 to 6 carbon atoms. The leftmost oxygen is oxygen contained in an oxyalkylene unit located at an end of the polymer backbone. $R^1$, X, and a are as defined above for the formula (1).

$R^3$ may be a hydrocarbon group having 1 to 3 carbon atoms or a hydrocarbon group having 1 or 2 carbon atoms. The hydrocarbon group may be an alkylene group, and methylene, ethylene, propylene, and butylene groups can be used. A methylene group is particularly preferred.

$R^4$ may be hydrogen or an alkyl group having 1 to 4 carbon atoms, hydrogen or an alkyl group having 1 to 3 carbon atoms. Examples of the alkyl group include hydrogen, methyl, ethyl, propyl, and butyl groups. $R^4$ may be hydrogen, a methyl group, or an ethyl group, hydrogen or a methyl group. $R^4$ may be a methyl group in order to increase the above-described average ratio of the number of the reactive silyl groups to the number of the ends of the polymer backbone.

[Chem 1]

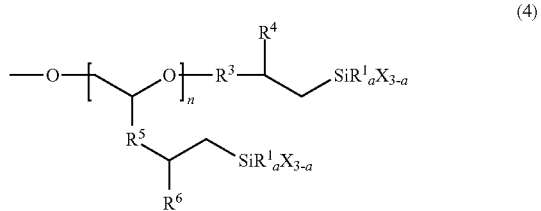

(4)

In the formula (4), $R^5$ represents a direct bond or a divalent linkage group having 1 to 6 carbon atoms, $R^6$ is hydrogen or a hydrocarbon group having 1 to 10 carbon atoms, and n is an integer from 1 to 10. The leftmost oxygen is oxygen contained in an oxyalkylene unit located at an end of the polymer backbone made up of the oxyalkylene units linked together. $R^1$, $R^3$, $R^4$, X, and a are as defined above for the formulae (1) and (3).

$R^5$ may be a divalent organic group having 1 to 6 carbon atoms. The organic group may be a hydrocarbon group or an oxygen atom-containing hydrocarbon group. The number of carbon atoms may be from 1 to 4, from 1 to 3, or from 1 or 2. The organic group may be $CH_2OCH_2$, $CH_2O$, $CH_2$, or $CH_2OCH_2$.

$R^6$ may be hydrogen or a hydrocarbon group having 1 to 5 carbon atoms, hydrogen or a hydrocarbon group having 1 to 3 carbon atoms, or hydrogen or a hydrocarbon group having 1 or 2 carbon atoms. $R^6$ may be hydrogen or a methyl group or hydrogen.

The terminal structure represented by the formula (4) is one terminal structure bonded to one end of the polymer backbone. Although including two or more reactive silyl groups, the formula (4) does not represent two or more ends but indicates that two or more reactive silyl groups are present in one terminal structure. The formula (4) does not include any part of the polymer backbone made up of the oxyalkylene repeating units. That is, in the formula (4), the bracketed structures the number of which is n are not the oxyalkylene repeating units in the polymer backbone.

The number-average molecular weight of the polyoxyalkylene polymer (A) is not limited to a particular range. The number-average molecular weight as determined by GPC as a polystyrene equivalent molecular weight may be from 3,000 to 100,000, from 3,000 to 50,000, or from 3,000 to 30,000. When the number-average molecular weight is 3,000 or more, the amount of the reactive silyl groups relative to the total polymer is in an appropriate range, and this is desirable in terms of production cost. When the number-average molecular weight is 100,000 or less, a viscosity desirable in terms of workability is likely to be achieved. The number-average molecular weight can be determined by GPC analysis as a polystyrene equivalent molecular weight.

The polyoxyalkylene polymer (A) is not limited to having a particular molecular weight distribution (Mw/Mn). To achieve a low viscosity, the molecular weight distribution of the polyalkylene polymer (A) may be narrow. Specifically, the polydispersity index Mw/Mn may be less than 2.0, 1.6 or less, 1.5 or less, or 1.4 or less. In order to improve various mechanical properties, such as to increase the durability and the elongation of the cured product, the polydispersity index Mw/Mn may be 1.2 or less. The polydispersity index Mw/Mn can be calculated from the number-average and weight-average molecular weights determined by GPC analysis as polystyrene equivalent molecular weights.

<Method of Producing Polyoxyalkylene Polymer (A)>

Hereinafter, the method of producing the polyoxyalkylene polymer (A) will be described. The polyoxyalkylene polymer (A) can be produced by introducing olefin groups into a hydroxy-terminated polyoxyalkylene polymer (C) using the reactivity of the hydroxy groups and then reacting the resulting polymer with a reactive silyl group-containing compound reactive with the olefin groups to introduce the reactive silyl groups.

The following describes the details of one or more embodiments of the method of producing the polyoxyalkylene polymer (A). The method of producing the polyoxyalkylene polymer (A) is not limited to that described below.

(Polymerization)

The polymer backbone of a polyoxyalkylene polymer can be formed by polymerizing an epoxy compound with a hydroxy group-containing initiator using a conventionally known method, and this polymerization yields the hydroxy-terminated polyoxyalkylene polymer (C). The polymerization method is not limited to particular details. To obtain a hydroxy-terminated polymer having a low polydispersity index (Mw/Mn), a polymerization method using a double metal cyanide complex catalyst such as a zinc hexacyano-cobaltate-glyme complex is preferred.

The hydroxy group-containing initiator is not limited to a particular type. Examples of the initiator include organic compounds having one or more hydroxy groups, such as ethylene glycol, propylene glycol, glycerin, pentaerythritol, low-molecular-weight polyoxypropylene glycol, low-molecular-weight polyoxypropylene triol, allyl alcohol, low-molecular-weight polyoxypropylene monoallyl ether, and low-molecular-weight polyoxypropylene monoalkyl ether.

The epoxy compound is not limited to a particular type. Examples of the epoxy compound include alkylene oxides such as ethylene oxide and propylene oxide and glycidyl ethers such as methyl glycidyl ether and butyl glycidyl ether. Propylene oxide is preferred.

(Reaction with Alkali Metal Salt)

When introducing olefin groups into the hydroxy-terminated polyoxyalkylene polymer (C), it is preferable to first allow an alkali metal salt to act on the hydroxy-terminated polyoxyalkylene polymer (C) and thereby convert the terminal hydroxy groups to metaloxy groups. A double metal cyanide complex catalyst may be used instead of the alkali metal salt. The above conversion results in formation of a metaloxy-terminated polyoxyalkylene polymer (D).

The alkali metal salt is not limited to a particular type. Examples of the alkali metal salt include sodium hydroxide, sodium alkoxide, potassium hydroxide, potassium alkoxide, lithium hydroxide, lithium alkoxide, cesium hydroxide, and cesium alkoxide. In terms of ease of handling and solubility, sodium hydroxide, sodium methoxide, sodium ethoxide, sodium tert-butoxide, potassium hydroxide, potassium methoxide, potassium ethoxide, and potassium tert-butoxide are preferred, and sodium methoxide and sodium tert-butoxide are more preferred. Sodium methoxide is particularly preferred in terms of availability, and sodium tert-butoxide is particularly preferred in terms of reactivity. The alkali metal salt may be dissolved in a solvent, and the solution may be used in the reaction.

The amount of the alkali metal salt used is not limited to a particular range. The molar ratio of the alkali metal salt to the hydroxy groups of the hydroxy-terminated polyoxyalkylene polymer (C) may be 0.5 or more, 0.6 or more, 0.7 or more, or 0.8 or more. The molar ratio may be 1.2 or less, or 1.1 or less. When the amount of the alkali metal salt used is in the above range, the reaction of conversion of the hydroxy groups to metaloxy groups is likely to progress sufficiently, and the occurrence of a side reaction due to the alkali metal salt remaining as an impurity can be avoided.

The alkali metal salt is used to convert the hydroxy groups of the hydroxy-terminated polyoxyalkylene polymer (C) to metaloxy groups. To allow this conversion reaction to take place efficiently, water may be removed in advance and any hydroxy group-containing substance other than the polyoxyalkylene polymer from the reaction system. The removal may be accomplished using a known method, examples of which include evaporation by heating, devolatilization under reduced pressure, spray vaporization, thin-film evaporation, and azeotropic devolatilization.

The temperature at which the alkali metal salt is allowed to act on the polymer (C) can be set as appropriate by those skilled in the art. The temperature may be from 50 to 150° C. or from 110 to 145° C. The time for which the alkali metal salt is allowed to act on the polymer (C) may be from 10 minutes to 5 hours or from 30 minutes to 3 hours.

(Reaction with Electrophile (E))

An olefin group-containing electrophile (E) is allowed to act on the metaloxy-terminated polyoxyalkylene polymer (D) obtained as described above. By the action of the electrophile (E), the metaloxy groups can be converted to olefin group-containing structures. This conversion results in formation of a polyoxyalkylene polymer (F) having olefin groups in its terminal structures.

The olefin group-containing electrophile (E) is not limited to a particular type, and may be any compound that can react with the metaloxy groups of the polyoxyalkylene polymer (D) to introduce olefin groups into the polyoxyalkylene polymer. Examples of the electrophile (E) include an olefin group-containing organic halide (E1) and an olefin group-containing epoxy compound (E2).

The olefin group-containing organic halide (E1), which is an example of the electrophile (E), can undergo a substitution reaction of the halogen with the metaloxy groups to form ether bonds and introduce terminal structures containing olefin groups into the polyoxyalkylene polymer. The olefin group-containing organic halide (E1) can be represented by, but is not limited to, the following formula (5).

$$Z-R^3-C(R^4)=CH_2 \quad (5)$$

In the formula (5), $R^3$ and $R^4$ are the same as $R^3$ and $R^4$ defined above for the formula (3), and Z represents a halogen atom. The polymer resulting from the reaction with the organic halide (E1) may be used as the polyoxyalkylene polymer (F) having olefin groups in its terminal structures, and the polymer (F) may be subjected to reactive silyl group introduction describe later. In this case, terminal structures represented by the formula (3) can be formed.

Specific examples of the olefin group-containing organic halide (E1) include, but are not limited to, vinyl chloride, allyl chloride, methallyl chloride, vinyl bromide, allyl bromide, methallyl bromide, vinyl iodide, allyl iodide, and methallyl iodide. In terms of ease of handling, allyl chloride and methallyl chloride are preferred. To increase the above-described average ratio of the number of the reactive silyl groups to the number of the ends of the polymer backbone, methallyl chloride, methallyl bromide, and methallyl iodide are preferred.

The amount of the olefin group-containing organic halide (E1) added is not limited to a particular range. The molar ratio of the organic halide (E1) to the hydroxy groups of the polyoxyalkylene polymer (C) may be 0.7 or more or 1.0 or more. The molar ratio may be 5.0 or less or 2.0 or less.

The temperature at which the olefin group-organic halide (E1) is reacted with the metaloxy-terminated polyoxyalkylene polymer (D) may be from 50 to 150° C. or from 110 to 140° C. The reaction time may be from 10 minutes to 5 hours or from 30 minutes to 3 hours.

The olefin group-containing epoxy compound (E2), which is another example of the electrophile (E), can undergo a ring-opening addition reaction of the epoxy groups with the metaloxy groups to form ether bonds and introduce terminal structures containing olefin and hydroxy groups into the polyoxyalkylene polymer. In the ring-opening addition reaction, one molecule of the epoxy compound (E2) or two or more molecules of the epoxy compound (E2) can be added per metaloxy group by adjusting the amount of the epoxy compound (E2) relative to the metaloxy groups and the reaction conditions.

The olefin group-containing epoxy compound (E2) can be represented by, but is not limited to, the following formula (6).

[Chem 2]

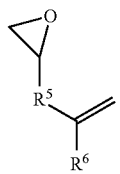

(6)

In the formula (6), $R^5$ and $R^6$ are the same as $R^5$ and $R^6$ defined above for the formula (4).

Specific examples of the olefin group-containing epoxy compound (E2) include, but are not limited to, allyl glycidyl ether, methallyl glycidyl ether, glycidyl acrylate, glycidyl methacrylate, and butadiene monoxide, which are preferred in terms of reaction activity. Particularly preferred is allyl glycidyl ether.

The amount of the olefin group-containing epoxy compound (E2) added may be adjusted as appropriate in view of the amount of the olefin groups to be introduced into the polymer and the reactivity of the compound (E2) with the polymer. In particular, the molar ratio of the epoxy compound (E2) to the hydroxy groups of the polyoxyalkylene polymer (C) may be 0.2 or more, or 0.5 or more. The molar ratio may be 5.0 or less or 2.0 or less.

The reaction temperature at which the olefin group-containing epoxy compound (E2) is allowed to undergo the ring-opening addition reaction with the metaloxy-terminated polyoxyalkylene polymer (D) may be from 60 to 150° C. or from 110 to 140° C.

Once the olefin group-containing epoxy compound (E2) is allowed to act on the metaloxy-terminated polyoxyalkylene polymer (D) as described above, ring opening of the epoxy groups occurs, leading to further formation of metaloxy groups. Thus, the epoxy compound (E2) may first be allowed to act on the polymer (D), and subsequently the olefin group-containing organic halide (E1) previously described may be allowed to act on the polymer. The compounds which may be used as the olefin group-containing organic halide (E1) in the embodiments are the same as those previously mentioned, and the amount of the organic halide (E1) used and the reaction temperature are also the same as those described above. This method is preferred because it can further increase the amounts of the olefin groups and reactive silyl groups introduced into the polymer. The polymer obtained by the method using the epoxy compound (E2) and organic halide (E1) in combination may be used as the polyoxyalkylene polymer (F) having olefin groups in its terminal structures, and the polymer (F) may be subjected to the reactive silyl group introduction described below. In this case, terminal structures represented by the formula (4) can be formed.

(Reactive Silyl Group Introduction)

The polyoxyalkylene polymer (F) having olefin groups in its terminal structures, which is obtained as described above, is subjected to a hydrosilylation reaction with a reactive silyl group-containing hydrosilane compound (G). Reactive silyl groups can be introduced into the polymer by the hydrosilylation reaction. Consequently, the reactive silyl group-containing polyoxyalkylene polymer (A) can be produced. The hydrosilylation reaction is easy to carry out and is advantageous also in that this reaction permits easy adjustment of the amount of the reactive silyl groups to be introduced and leads to the resulting polymer having stable physical properties.

Specific examples of the reactive silyl group-containing hydrosilane compound (G) include: halosilanes such as trichlorosilane, dichloromethylsilane, chlorodimethylsilane, dichlorophenyl silane, (chloromethyl)dichlorosilane, (dichloromethyl)dichlorosilane, bis(chloromethyl)chlorosilane, (methoxymethyl)dichlorosilane, (dimethoxymethyl) dichlorosilane, and bis(methoxymethyl)chlorosilane; alkoxysilanes such as trimethoxysilane, triethoxysilane, dimethoxymthylsilane, diethoxymethylsilane, dimethoxyphenylsilane, ethyldimethoxysilane, methoxydimethylsilane, ethoxydimethylsilane, (chloromethyl)methylmethoxysilane, (chloromethyl)dimethoxysilane, (chloromethyl) diethoxysilane, bis(chloromethyl)methoxysilane, (methoxymethyl)methylmethoxysilane, (methoxymethyl) dimethoxysilane, bis(methoxymethyl)methoxysilane, (methoxymethyl)diethoxysilane, (ethoxymethyl)diethoxysilane, (3,3,3-trifluoropropyl)dimethoxysilane, (N,N-diethylaminomethyl)dimethoxysilane, (N,N-diethylaminomethyl) diethoxysilane, [(chloromethyl)dimethoxysilyloxy] dimethylsilane, [(chloromethyl)diethoxysilyloxy] dimethylsilane, [(methoxymethyl)dimethoxysilyloxy] dimethylsilane, [(methoxymethyl)diethoxysilyloxy] dimethylsilane, [(diethylaminomethyl)dimethoxysilyloxy] dimethylsilane, and [(3,3,3-trifluoropropyl) dimethoxysilyloxy]dimethylsilane; acyloxysilanes such as diacetoxymethylsilane and diacetoxyphenylsilane; ketoximatosilanes such as bis(dimethylketoximato)methylsilane and bis(cyclohexylketoximato)methylsilane; and isopropenyloxysilanes (deacetonated type) such as triisopropenyloxysilane, (chloromethyl)diisopropenyloxysilane, and (methoxymethyl)diisopropenyloxysilane.

The amount of the reactive silyl group-containing hydrosilane compound (G) used may be set as appropriate in view of the amount of the olefin groups of the polyoxyalkylene polymer (F). Specifically, the molar ratio of the hydrosilane compound (G) to the olefin groups of the polyoxyalkylene polymer (F) may be from 0.05 to 10 or from 0.3 to 3 in terms of reactivity. To increase the modulus value of the cured product of the polyoxyalkylene polymer (A), the molar ratio may be 0.5 or more or 0.7 or more. In terms of economy, the molar ratio may be 2.5 or less or 2 or less.

The hydrosilylation reaction may be conducted in the presence of a hydrosilylation catalyst to accelerate the reaction. Known examples of the hydrosilylation catalyst include metals such as cobalt, nickel, iridium, platinum, palladium, rhodium, and ruthenium and complexes of these metals, and any of these can be used in the reaction. Specific examples of the catalyst include: platinum supported on a support such as alumina, silica, or carbon black; chloroplatinic acid; a chloroplatinic acid complex composed of chloroplatinic acid and another compound such as an alcohol, an aldehyde, or a ketone; platinum-olefin complexes such as $Pt(CH_2=CH_2)_2(PPh_3)$ and $Pt(CH_2=CH_2)_2Cl_2$; platinum-vinyl siloxane complexes such as $Pt\{(vinyl)Me_2SiOSiMe_2(vinyl)\}$ and $Pt\{Me(vinyl)SiO\}_4$; platinum-phosphine complexes such as $Pt(PPh_3)_4$ and $Pt(PBu_3)_4$; and platinum-phosphite complexes such as $Pt\{P(OPh)_3\}_4$. Platinum catalysts such as chloroplatinic acid and platinum-vinyl siloxane complexes are preferred in terms of reaction efficiency.

The hydrosilylation reaction can be conducted without the use of any solvent. An organic solvent may be added in order to uniformly dissolve the polyoxyalkylene polymer (F), hydrosilane compound (G), and hydrosilylation catalyst and to easily accomplish the temperature control of the reaction system and the addition of the hydrosilylation catalyst.

The hydrosilylation reaction is not limited to being conducted under a particular temperature condition, and the temperature condition of the reaction can be set as appropriate by those skilled in the art. In order to reduce the viscosity of the reaction system or increase the reactivity, the reaction may be conducted under heating. To be specific, the reaction may be conducted at a temperature of 50 to 150° C. or conducted at a temperature of 70 to 120° C. The reaction time can also be set as appropriate. The reaction time may be adjusted along with the temperature condition to prevent the occurrence of an unintended condensation reaction between polymers. To be specific, the reaction time may be from 30 minutes to 5 hours or 3 hours or less.

The hydrosilylation reaction may be conducted in the presence of a trialkyl orthocarboxylate. In this case, viscosity increase during the hydrosilylation reaction can be reduced, and the storage stability of the resulting polymer can be improved.

Examples of the trialkyl orthocarboxylate include trimethyl orthoformate, triethyl orthoformate, trimethyl orthoacetate, and triethyl orthoacetate. Preferred are trimethyl orthoformate and trimethyl orthoacetate.

In the case where a trialkyl orthocarboxylate is used, the amount of the trialkyl orthocarboxylate used is not limited to a particular range. The amount of the trialkyl orthocarboxylate may be from about 0.1 to 10 parts by weight or from about 0.1 to 3 parts by weight per 100 parts by weight of the polyoxyalkylene polymer (A).

Another method which may be used to produce the polyoxyalkylene polymer (A) is one in which a compound (H) having a reactive silyl group and an isocyanate group in the molecule is allowed to act on the hydroxy-terminated polyoxyalkylene polymer (C) to form urethane bonds and introduce reactive silyl groups. The reactive silyl group-containing polyoxyalkylene polymer (A) can be produced also by this method.

The compound (H) having a reactive silyl group and an isocyanate group in the molecule is not limited to a particular type, and may be any compound having in the molecule both a reactive silyl group and an isocyanate group capable of undergoing a urethanization reaction with the hydroxy group of the polyoxyalkylene polymer (C). Specific examples of the compound (H) include (3-isocyanatopropyl)trimethoxysilane, (3-isocyanatopropyl)dimethoxymethylsilane, (3-isocyanatopropyl)triethoxysilane, (3-isocyanatopropyl)diethoxymethylsilane, (isocyanatomethyl)trimethoxysilane, (isocyanatomethyl)triethoxysilane, (isocyanatomethyl)dimethoxymethylsilane, and (isocyanatomethyl)diethoxymethylsilane.

The amount of the compound (H) having a reactive silyl group and an isocyanate group in the molecule may be chosen as appropriate in view of the amount of the hydroxy groups of the polyoxyalkylene polymer (C). To be specific, the molar ratio of the isocyanate groups of the compound (H) to the hydroxy groups of the polyoxyalkylene polymer (C) may be 0.5 or more, 0.8 or more, or 0.9 or more. The upper limit of the amount of the compound (H) used is not limited to a particular value. The molar ratio is desirably 1 or less but may be more than 1. In the case where the molar ratio is more than 1, an excess of the compound (H) may be removed by a process such as devolatilization under reduced pressure after the urethanization reaction, may be converted to another compound through a reaction with an active hydrogen group-containing compound, or may be allowed to remain in the polyoxyalkylene polymer (A). The compound (H) or its derivative remaining in the polyoxyalkylene polymer (A) can act as a silane coupling agent.

The urethanization reaction can be conducted without the use of any urethanization catalyst. The urethanization reaction may be conducted in the presence of a urethanization catalyst in order to increase the reaction rate and the reaction percentage. Examples of urethanization catalysts which may be used include conventionally known urethanization catalysts such as catalysts listed in Polyurethanes: Chemistry and Technology, Part I, Table 30, Chapter 4, Saunders and Frisch, Interscience Publishers, New York, 1963. Specific examples of the catalysts include, but are not limited to, base catalysts such as organotin compounds, bismuth compounds, and organic amines.

Among known urethanization catalysts, the following organotin compounds are preferred as high-activity catalysts: tin octylate, tin stearate, dibutyltin dioctoate, dibutyltin dioleyl maleate, dibutyltin dibutyl maleate, dibutyltin dilaurate, 1,1,3,3-tetrabutyl-1,3-dilauryloxycarbonyl distannoxane, dibutyltin diacetate, dibutyltin diacetylacetonate, dibutyltin bis(o-phenylphenoxide), dibutyltin oxide, dibutyltin bis(triethoxysilicate), dibutyltin distearate, dibutyltin bis(isononyl-3-mercaptopropionate), dibutyltin bis(isooctylmercaptopropionate), dibutyltin bis(isooctylthioglycolate), dioctyltin oxide, dioctyltin dilaurate, dioctyltin diacetate, and dioctyltin diversatate. Catalysts having low activity against reactive silyl groups are preferred and, in this respect, sulfur atom-containing tin catalysts such as dibutyltin bis(isononyl-3-mercaptopropionate), dibutyltin bis(isooctylmercaptopropionate), and dibutyltin bis(isooctylthioglycolate) are particularly preferred.

The amount of the urethanization catalyst added can be set as appropriate by those skilled in the art. In terms of reaction activity, the amount of the urethanization catalyst may be from 1 to 1000 ppm or from 10 to 100 ppm per 100 parts by weight of the polyoxyalkylene polymer (C). When the amount of the urethanization catalyst is in this range, a sufficient reaction activity can be achieved, and the physical properties such as heat resistance, weathering resistance, hydrolysis resistance, and storage stability of the resulting polyoxyalkylene polymer (A) can be maintained at high levels.

The urethanization reaction can be conducted without the use of any solvent. An organic solvent may be added in order to uniformly dissolve the polyoxyalkylene polymer (C), compound (H), and urethanization catalyst and to easily accomplish the temperature control of the reaction system and the addition of the urethanization catalyst.

The temperature of the urethanization reaction can be set as appropriate by those skilled in the art. The reaction temperature may be from 50 to 120° C. or from 70 to 100° C. The reaction time can also be set as appropriate. The reaction time may be adjusted along with the temperature condition to prevent the occurrence of an unintended condensation reaction between polymers. To be specific, the reaction time may be from 15 minutes to 5 hours or from 30 minutes to 3 hours.

Still another method which may be used to produce the polyoxyalkylene polymer (A) is one in which a compound (I) having a reactive silyl group and a mercaptan group in the molecule is allowed to act on the polyoxyalkylene polymer (F) having olefin groups in its terminal structures to form sulfide bonds by addition of the mercaptan groups to the olefin groups and introduce reactive silyl groups. The reactive silyl group-containing polyoxyalkylene polymer (A) can be produced also by this method.

The compound (I) having a reactive silyl group and a mercaptan group in the molecule is not limited to a particular type, and may be any compound having in the molecule both a reactive silyl group and a mercaptan group capable of undergoing an addition reaction with the olefin group of the polyoxyalkylene polymer (F). Specific examples of the compound (I) include (3-mercaptopropyl)methyldimethoxysilane, (3-mercaptopropyl)trimethoxysilane, (3-mercaptopropyl)methyldiethoxysilane, (3-mercaptopropyl)triethoxysilane, (mercaptomethyl)methyldimethoxysilane, (mercaptomethyl)trimethoxysilane, (mercaptomethyl)methyldiethoxysilane, and (mercaptomethyl)triethoxysilane.

The amount of the compound (I) having a reactive silyl group and a mercaptan group in the molecule may be chosen as appropriate in view of the amount of the olefin groups of the polyoxyalkylene polymer (F). To be specific, the molar ratio of the mercaptan groups of the compound (I) to the olefin groups of the polyoxyalkylene polymer (F) may be 0.5 or more, 0.8 or more, or 0.9 or more. The upper limit of the amount of the compound (I) used is not limited to a particular value. The molar ratio is desirably 1 or less but may be more than 1. In the case where the molar ratio is more than 1, an excess of the compound (I) may be removed by a process such as devolatilization under reduced pressure after the addition reaction, may be converted to another compound through a reaction with an unsaturated group-containing compound, or may be allowed to remain in the polyoxyalkylene polymer (A). The compound (I) or its derivative remaining in the polyoxyalkylene polymer (A) can act as a silane coupling agent.

The addition reaction of the mercaptan groups with the olefin groups can be conducted without the use of any radical initiator. The addition reaction may be conducted in the presence of a radical initiator in order to increase the reaction rate and the reaction percentage. A conventionally known initiator can be used as the radical initiator. Specific examples of the radical initiator include, but are not limited to, azo initiators and peroxide initiators.

Amon known radical initiators, catalysts having low activity against reactive silyl groups are preferred. In this respect, azo initiators such as 2,2'-azobis(isobutyronitrile) (AIBN), 2,2'-azobis(2-methylbutyronitrile) (V-59), and 2,2'-azobis(1-methylcyclohexanecarbonitrile) (V-40) are particularly preferred.

The amount of the radical initiator added can be set as appropriate by those skilled in the art. In terms of reaction activity, the amount of the radical may be from 0.01 to 10 parts by weight or from 0.1 to 10 parts by weight per 100 parts by weight of the polyoxyalkylene polymer (F). The radical initiator may be dissolved in an organic solvent, and the solution may be used in the reaction.

The temperature of the addition reaction can be set as appropriate by those skilled in the art. The reaction temperature may be from 50 to 120° C. or from 70 to 100° C. The reaction time can also be set as appropriate. The reaction time may be adjusted along with the temperature condition to prevent the occurrence of an unintended condensation reaction between polymers. To be specific, the reaction time may be from 15 minutes to 10 hours or from 30 minutes to 6 hours.

((Meth)Acrylic Ester Polymer (B))

The curable composition of one or more embodiments of the present invention further contains a (meth)acrylic ester polymer (B) having a reactive silyl group.

The reactive silyl group of the (meth)acrylic ester polymer (B) is represented by the following formula (2).

$$—SiR^2_b Y_{3-b} \quad (2)$$

$R^2$ represents an unsubstituted hydrocarbon group having 1 to 20 carbon atoms. The number of carbon atoms may be from 1 to 10, from 1 to 8, from 1 to 6, from 1 to 3, or 1 or 2. Examples of $R^2$ include: alkyl groups such as methyl, ethyl, n-propyl, isopropyl, n-butyl, tert-butyl, n-hexyl, 2-ethylhexyl, and n-dodecyl groups; unsaturated hydrocarbon groups such as vinyl, isopropenyl, and allyl groups; cycloalkyl groups such as a cyclohexyl group; aryl groups such as phenyl, toluyl, and 1-naphthyl groups; and aralkyl groups such as a benzyl group. $R^2$ may be an alkyl group or an aryl group, a methyl group, an ethyl group, a phenyl group, a methyl group or an ethyl group, or a methyl group. One group may be used as the $R^2$ group, or two or more groups may be used as the $R^2$ groups.

Y represents a hydroxy or hydrolyzable group. Examples of Y include a hydroxy group, hydrogen, halogens, and alkoxy, acyloxy, ketoximate, amino, amide, acid amide, aminooxy, mercapto, and alkenyloxy groups. The alkoxy groups etc. may have a substituent. In terms of moderate hydrolyzability and ease of handling, alkoxy groups are preferred, methoxy, ethoxy, n-propoxy, and isopropoxy groups are more preferred, methoxy and ethoxy groups are even more preferred, and a methoxy group is particularly preferred. One group may be used as the Y group, or two or more groups may be used as the Y groups.

In the formula (2), b may be 0, 1, or 2, or 0 or 1. In terms of the balance between the curability of the curable composition and the physical properties of the cured product, b may be 1. In order to further improve the curability of the composition and the recovery performance of the cured product, b may be 0.

Examples of the reactive silyl group represented by the formula (2) include trimethoxysilyl, triethoxysilyl, tris(2-propenyloxy)silyl, triacetoxysilyl, methyldimethoxysilyl, methyldiethoxysilyl, ethyldimethoxysilyl, ethyldiethoxysilyl, n-propyldimethoxysilyl, n-hexyldimethoxysilyl, phenyldimethoxysilyl, phenyldiethoxysilyl, methyldiisopropenoxysilyl, methyldiphenoxysilyl, and dimethylmethoxysilyl groups. In order to ensure both the storage stability and curability of the curable composition, a methyldimethoxysilyl group is more preferred. In order to further improve the curability of the composition and the recovery performance of the cured product, a trimethoxysilyl group is more preferred.

The reactive silyl group of the polyoxyalkylene polymer (A) and the reactive silyl group of the (meth)acrylic ester polymer (B) may be the same or different.

In one or more embodiments of the present invention, the location and number of the reactive silyl groups of the (meth)acrylic ester polymer (B) meet predetermined requirements. Specifically, in the (meth)acrylic ester polymer (B), the average number per molecule of reactive silyl groups bonded at the ends of the polymer backbone is from 0.30 to 1.00, and the average number per molecule of reactive silyl groups bonded inside the polymer backbone is from 0 to less than 0.30. The former average number refers to the average number per molecule of reactive silyl groups bonded at the ends of the polymer backbone among all reactive silyl groups contained in the polymer (B). The latter average number refers to the average number per molecule of reactive groups bonded inside the polymer backbone among all reactive silyl groups contained in the polymer (B). As a result of combined use of the (meth)acrylic ester polymer (B) meeting these requirements and the polyoxyalkylene polymer (A) described above, the cured product of the curable composition of one or more embodiments of the present invention can exhibit both a high strength and a high elongation. The values of the average numbers can be determined by the methods as described in Examples. The values of the average numbers may be determined by methods other than those as described in Examples; for example, the values of the average numbers may be calculated from results of GPC analysis and NMR analysis of the (meth)acrylic ester polymer (B).

The reactive silyl groups bonded at the ends of the polymer backbone refer to reactive silyl groups bonded to the ends of the polymer backbone made up of monomer units linked together. Such reactive silyl groups bonded at the ends of the polymer backbone can be suitably formed, for example, by the below-described method using a chain transfer agent, although the formation of the reactive silyl groups is not limited to being accomplished by this method. The (meth)acrylic ester polymer (B) of one or more embodiments of the present invention in which the average number of the reactive silyl groups bonded at the ends of the polymer backbone is 1.00 or less can be formed, for example, by using a method in which the reactive silyl group is introduced into one end of the polymer backbone. The (meth) acrylic ester polymer (B) of one or more embodiments of the present invention may be a polymer having a reactive silyl group at one end of the polymer backbone and having no reactive silyl group at the other end of the polymer backbone.

In the case of employing a method in which the reactive silyl groups are introduced into both ends of the polymer backbone, the average number per polymer molecule of the reactive silyl groups bonded at the ends of the polymer backbone is about 2. Preferably, the (meth)acrylic ester polymer (B) of one or more embodiments of the present invention does not include a (meth)acrylic ester polymer having reactive silyl groups at both ends of the polymer backbone.

The reactive silyl groups bonded inside the polymer backbone refer to reactive silyl groups bonded to any of the monomer units of the polymer backbone that are other than the monomer units located at the ends of the polymer backbone. Such reactive silyl groups may be described as being bonded to the polymer as side chains. Such reactive silyl groups bonded inside the polymer backbone can be suitably formed, for example, by the below-described method in which reactive silyl group-containing monomers are copolymerized, although the formation of the reactive silyl groups is not limited to being accomplished by this method. In this case, the average number per polymer molecule of the reactive silyl groups bonded inside the polymer backbone can be adjusted by changing the amounts of the reactive silyl group-containing monomers used.

In the (meth)acrylic ester polymer (B), the average number per molecule of the reactive silyl groups bonded at the ends of the polymer backbone is from 0.30 to 1.00. In order to further improve the strength of the cured product of the curable composition of one or more embodiments of the present invention, the average number may be from 0.65 to 1.00, from 0.83 to 1.00, from 0.85 to 1.00, or from 0.90 to 1.00.

In the (meth)acrylic ester polymer (B), the average number per molecule of the reactive silyl groups bonded inside the polymer backbone is from 0 to less than 0.30. That is, there need not be any reactive silyl groups bonded inside the polymer backbone (this means that the average number may be 0). In the case where there are reactive silyl groups bonded inside the polymer backbone, the average number may be less than 0.20, less than 0.15, or less than 0.05 in order to improve the strength and elongation of the cured product of the curable composition of one or more embodiments of the present invention.

The average number per molecule of reactive silyl groups contained in the (meth)acrylic ester polymer (B) (i.e., the sum of the above-described average number of reactive silyl groups bonded at the ends of the polymer backbone and the above-described average number of reactive silyl groups bonded inside the polymer backbone) is limited to the range of 0.30 to less than 1.30 due to the above-described requirements. The average number per molecule of reactive silyl groups contained in the (meth)acrylic ester polymer (B) may be from 0.65 to 1.20 or from 0.85 to 1.05.

The (meth)acrylic ester monomer for forming the main chain of the (meth)acrylic ester polymer (B) is not limited to a particular type, and various monomers can be used. Specific examples include (meth)acrylic monomers such as methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth) acrylate, toluyl (meth)acrylate, benzyl (meth)acrylate, 2-methoxyethyl (meth)acrylate, 3-methoxybutyl (meth) acrylate, 2-hydroxyethyl (meth)acrylate, 2-hydroxypropyl (meth)acrylate, stearyl (meth)acrylate, glycidyl (meth)acrylate, (3-trimethoxysilyl)propyl (meth)acrylate, (3-dimethoxymethylsilyl)propyl (meth)acrylate, (2-trimethoxysilyl) ethyl (meth)acrylate, (2-dimethoxymethylsilyl)ethyl (meth) acrylate, trimethoxysilylmethyl (meth)acrylate, (dimethoxymethylsilyl)methyl (meth)acrylate, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth) acrylate, trifluoromethyl (meth)acrylate, bis(trifluoromethyl)methyl (meth)acrylate, 2-trifluoromethyl-2-perfluoroethyl ethyl (meth)acrylate, 2-perfluorohexylethyl (meth)acrylate, 2-perfluorodecylethyl (meth)acrylate, and 2-perfluorohexadecylethyl (meth)acrylate.

Examples of monomers other than those mentioned above include: acrylic acids such as acrylic acid and methacrylic acid; amide group-containing monomers such as N-methylolacrylamide and N-methylolmethacrylamide; epoxy group-containing monomers such as glycidyl acrylate and glycidyl methacrylate; and monomers containing a nitrogen-containing group such as diethylaminoethyl acrylate and diethylaminoethyl methacrylate.

The (meth)acrylic ester polymer (B) used may be a polymer resulting from copolymerization of a (meth)acrylic ester monomer and a vinyl monomer copolymerizable with the (meth)acrylic ester monomer. The vinyl monomer is not limited to a particular type, and examples of the vinyl monomer include: styrene monomers such as styrene, vinyltoluene, α-methylstyrene, chlorostyrene, styrenesulfonic acid, and salts of styrenesulfonic acid; fluorine-containing vinyl monomers such as perfluoroethylene, perfluoropropylene, and vinylidene fluoride; silicon-containing vinyl monomers such as vinyltrimethoxysilane and vinyltriethoxysilane; maleic monomers such as maleic anhydride, maleic acid, and monoalkyl and dialkyl esters of maleic acid; fumaric monomers such as fumaric acid and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amide group-containing vinyl monomers such as acrylamide and methacrylamide; vinyl ester monomers such as vinyl acetate, vinyl propionate, vinyl pivalate, vinyl benzoate, and vinyl cinnamate; alkenyl monomers such as ethylene and propylene; conjugated diene monomers such as butadiene and isoprene; vinyl chloride; vinylidene chloride; allyl chloride; and allyl alcohol. Two or more of these may be used as copolymerization components.

In one or more embodiments of the present invention, methyl methacrylate may be included as a monomer for forming the main chain of the (meth)acrylic ester polymer (B). The proportion of methyl methacrylate units in the total monomer units of the (meth)acrylic ester polymer (B) may be from 35 to 85% by weight. The weight of the total monomer units includes only the weights of the monomers and is exclusive of the weights of the chain transfer agent and radical initiator. When the proportion of methyl methacrylate units in the (meth)acrylic ester polymer (B) is in the above range, the strength of the cured product of the composition of one or more embodiments of the present invention can be further improved. The proportion of methyl methacrylate units may be from 60 to 85% by weight or may be from 70 to 85% by weight.

In one or more embodiments of the present invention, the proportion of alkyl methacrylate units in the total monomer units of the (meth)acrylic ester polymer (B) may be from 70 to 85% by weight. The alkyl of the alkyl methacrylate units is an unsubstituted alkyl group having 1 to 4 carbon atoms (specific examples include methyl, ethyl, n-propyl, isopropyl, n-butyl, isobutyl, and tert-butyl groups). The weight of the total monomer units includes only the weights of the monomers and is exclusive of the weights of the chain transfer agent and radical initiator. When the proportion of the alkyl methacrylate units in the (meth)acrylic ester polymer (B) is in the above range, the strength of the cured product of the composition of one or more embodiments of the present invention can be further improved. The proportion of the alkyl methacrylate units may be from 75 to 85% by weight.

It is common practice for those skilled in the art to choose the monomer proportions of the (meth)acrylic ester polymer (B) depending on the application or purpose. For a product such as an adhesive which is required to have a high strength, the (meth)acrylic ester polymer (B) may be a polymer having a relatively high glass transition temperature (Tg). The glass transition temperature Tg may be from 0 to 200° C. or may be from 20 to 100° C. The Tg is determined by the Fox equation given below.

$$1/(Tg(K))=\Sigma(Mi/Tgi) \quad \text{Fox equation:}$$

In this equation, Mi represents the weight fraction of a monomer component i of the polymer and Tgi represents the glass transition temperature (K) of a homopolymer of the monomer i.

The method of synthesizing the (meth)acrylic ester polymer (B) is not limited to a particular technique, and any known method may be used. Radical polymerization is preferred in terms of usability of monomers and ease of control of the polymerization reaction.

The radical polymerization can be broadly classified into "free radical polymerization" and "living radical polymerization". The "free radical polymerization" is a simple polymerization method in which a monomer is polymerized using an azo compound or a peroxide as a polymerization initiator. When conducted using a chain transfer agent having a specified functional group, the "free radical polymerization" can yield a polymer having the functional group at an end of the polymer backbone. In "living radical polymerization", the growing polymer ends grow under specified reaction conditions without undergoing a side reaction such as a termination reaction. The "living radical polymerization" can yield a polymer having a desired molecular weight, a narrow molecular weight distribution, and a low viscosity, and permits structural monomer units derived from a monomer having a specified functional group to be introduced substantially at desired locations in the resulting polymer. The details of these polymerization methods are disclosed in paras. [0086] to [0094] of WO 2012/020560 and paras. [0061] to [0068] of Japanese Laid-Open Patent Application Publication No. 2014-114434.

Examples of other polymerization methods which may be used include: a method as described in Japanese Laid-Open Patent Application Publication No. 2001-040037, in which a metallocene catalyst and a thiol compound having at least one reactive silyl group in the molecule are used to obtain an acrylic polymer; and a high-temperature continuous polymerization method as described in Japanese Laid-Open Patent Application Publication (Translation of PCT Application) No. S57-502171, Japanese Laid-Open Patent Application Publication No. S59-006207, or Japanese Laid-Open Patent Application Publication No. S60-511992, in which continuous polymerization of a vinyl monomer is conducted using a mixing vessel-type reactor.

The method of introducing reactive silyl groups into the (meth)acrylic ester polymer is not limited to a particular technique. For example, the methods listed below can be used.

(iv) A method in which a compound having a polymerizable unsaturated group and a reactive silyl group is copolymerized with the monomer as described above. With this method, the reactive silyl groups tend to be randomly introduced inside the polymer backbone.

(v) A method in which a (meth)acrylic ester polymer is produced by polymerization using a mercaptosilane compound having a reactive silyl group as a chain transfer agent. With this method, the reactive silyl groups can be introduced into the ends of the polymer backbone.

(vi) A method in which a compound having a polymerizable unsaturated group and a reactive functional group (V group) is copolymerized and then the resulting copolymer is reacted with a compound having a reactive silyl group and a functional group reactive with the V group. Specific examples of the method (vi) include: a method in which 2-hydroxyethyl acrylate is copolymerized and then the resulting copolymer is reacted with an isocyanatosilane having a reactive silyl group; and a method in which glycidyl acrylate is copolymerized and then the resulting copolymer is reacted with an aminosilane compound having a reactive silyl group.

(vii) A method in which terminal functional groups of a (meth)acrylic ester polymer synthesized by living radical polymerization are modified to introduce reactive silyl groups into the polymer. The living radical polymerization allows easy introduction of functional groups into the ends of the polymer backbone. The reactive silyl groups can be introduced into the ends of the polymer backbone by modifying the terminal functional groups.

The following describes examples of silicon compounds which can be used to introduce reactive silyl groups into a (meth)acrylic ester polymer by any of the above methods. Examples of the compound used in the method (iv) and having a polymerizable unsaturated group and a reactive silyl group include 3-(trimethoxysilyl)propyl (meth)acrylate, 3-(dimethoxymethylsilyl)propyl (meth)acrylate, 3-(triethoxysilyl)propyl (meth)acrylate, (trimethoxysilyl)methyl (meth)acrylate, (dimethoxymethylsilyl)methyl (meth)acrylate, (triethoxysilyl)methyl (meth)acrylate, (diethoxymethylsilyl)methyl (meth)acrylate, and 3-((methoxymethyl)dimethoxysilyl)propyl (meth)acrylate. In terms of availability, 3-trimethoxysilylpropyl (meth)acrylate and 3-(dimethoxymethylsilyl)propyl (meth)acrylate are particularly preferred.

Examples of the mercaptosilane compound used in the method (v) and having a reactive silyl group include (3-mercaptopropyl)trimethoxysilane, (3-mercaptopropyl)dimethoxymethylsilane, (3-mercaptopropyl)triethoxysilane, (mercaptomethyl)trimethoxysilane, (mercaptomethyl)dimethoxymethylsilane, and (mercaptomethyl)triethoxysilane.

Examples of the compound used in the method (vi) and having a reactive silyl group and a functional group reactive with the V group include: isocyanatosilane compounds such as (3-isocyanatopropyl)trimethoxysilane, (3-isocyanatopropyl)dimethoxymethyl silane, (3-isocyanatopropyl)triethoxysilane, (isocyanatomethyl)trimethoxysilane, (isocyanatomethyl)triethoxysilane, (isocyanatomethyl) dimethoxymethylsilane, and (isocyanatomethyl) diethoxymethylsilane; epoxysilane compounds such as (3-glycidoxypropyl)trimethoxysilane, (3-glycidoxypropyl)triethoxysilane, (3-glycidoxypropyl)dimethoxymethyl silane, (glycidoxymethyl)trimethoxysilane, (glycidoxymethyl)triethoxysilane, (glycidoxymethyl)dimethoxymethylsilane, and (glycidoxymethyl)diethoxymethylsilane; and aminosilane compounds such as (3-aminopropyl)trimethoxysilane, (3-aminopropyl)triethoxysilane, (3-aminopropyl)dimethoxymethylsilane, (aminomethyl)trimethoxysilane, (aminomethyl)triethoxysilane, (aminomethyl)dimethoxymethylsilane, (N-cyclohexylaminomethyl)triethoxysilane, (N-cyclohexylamino)methyldiethoxymethylsilane, (N-phenylaminomethyl)trimethoxysilane, (N-(2-aminoethyl)aminomethyl)trimethoxysilane, and (N-(2-aminoethyl)-3-aminopropyl)trimethoxysilane.

In the method (vii), any modification reaction can be used. Examples of the modification reaction method include: a method using a compound having a reactive silyl group and a functional group reactive with the terminal reactive group resulting from polymerization; and a method in which double bonds are introduced into the ends of the polymer backbone using a compound having a double bond and a functional group reactive with the terminal reactive group and subsequently reactive silyl groups are introduced into the ends of the polymer backbone through a process such as hydrosilylation.

The methods described above may be used in any combination. For example, the combined use of the methods (vi) and (v) can result in a (meth)acrylic ester polymer having reactive silyl groups both at the ends of the polymer backbone and inside the polymer backbone.

The number-average molecular weight of the (meth) acrylic ester polymer (B) is not limited to a particular range. The number-average molecular weight as determined by GPC analysis as a polystyrene equivalent molecular weight may be from 500 to 100,000, from 1,000 to 10,000, or from 1,200 to 3,000. When the number-average molecular weight of the (meth)acrylic ester polymer (B) is in this range, a cured product that exhibits a sufficient strength and elongation is likely to be formed, and a viscosity desirable in terms of workability is likely to be achieved.

Methods for blending a polyoxyalkylene polymer and a (meth)acrylic ester polymer are proposed, for example, in Japanese Laid-Open Patent Application Publication No. S59-122541, Japanese Laid-Open Patent Application Publication No. S63-112642, Japanese Laid-Open Patent Application Publication No. H6-172631, and Japanese Laid-Open Patent Application Publication No. H11-116763. An alternative method is to polymerize a (meth)acrylic ester monomer in the presence of a reactive silyl group-containing polyoxypropylene polymer. The details of such production methods are disclosed in various publications such as Japanese Laid-Open Patent Application Publication No. S59-78223, Japanese Laid-Open Patent Application Publication No. S60-228516, and Japanese Laid-Open Patent Application Publication No. S60-228517. Also in one or more embodiments of the present invention, the blending of the polyoxyalkylene polymer (A) and the (meth)acrylic ester polymer (B) can be accomplished by, but is not limited to, any of the above methods.

The polyoxyalkylene polymer (A):(meth)acrylic ester polymer (B) weight ratio in the curable composition of one or more embodiments of the present invention is not limited to a particular range. The polyoxyalkylene polymer (A): (meth)acrylic ester polymer (B) weight ratio may be from 90:10 to 40:60, from 80:20 to 50:50, from 80:20 to 55:45, or from 75:25 to 65:35. When the weight ratio between the two polymers is in this range, the curable composition of one or more embodiments of the present invention is likely to attain a viscosity desirable in terms of workability, and the cured product of the composition is likely to exhibit a high strength and a high elongation. The polyoxyalkylene polymer (A) and (meth)acrylic ester polymer (B) may be compatible with each other. The two polymers can be made compatible by appropriately choosing the types and proportions of the monomers for forming the polymers. One polymer may be used alone as the polyoxyalkylene polymer (A) of one or more embodiments of the present invention, or two or more polymers may be used in combination as the polyoxyalkylene polymer (A). One polymer may be used alone as the (meth)acrylic ester polymer (B) of one or more embodiments of the present invention, or two or more polymers may be used in combination as the (meth)acrylic ester polymer (B).

(Silanol Condensation Catalyst)

The curable composition of one or more embodiments of the present invention may contain a silanol condensation catalyst in order to accelerate the hydrolysis and dehydration condensation reaction of the reactive silyl groups of the polyoxyalkylene polymer (A) and (meth)acrylic ester polymer (B), i.e., the curing reaction of the composition.

The silanol condensation catalyst used can be a conventionally known catalyst. Specifically, for example, an organotin compound, a metal carboxylate, an amine compound, a carboxylic acid, an alkoxy metal, or an inorganic acid can be used as the silanol condensation catalyst.

Specific examples of the organotin compound include dibutyltin dilaurate, dibutyltin dioctanoate, dibutyltin bis (butyl maleate), dibutyltin diacetate, dibutyltin oxide, dibutyltin bis(acetylacetonate), a reaction product of dibutyltin oxide and a silicate compound, a reaction product of dibutyltin oxide and a phthalic ester, dioctyltin diacetate, dioctyltin dilaurate, dioctyltin bis(ethyl maleate), dioctyltin bis(octyl maleate), dioctyltin bis(acetylacetonate), and a reaction product of dioctyltin oxide and a silicate compound. Dioctyltin compounds are preferred in view of the recent increased attention to environmental issues.

Specific examples of the metal carboxylate include tin carboxylate, bismuth carboxylate, titanium carboxylate, zirconium carboxylate, and iron carboxylate. The metal carboxylate may be a combination of any of the carboxylic acids mentioned below and any of various metals.

Specific examples of the amine compound include: amines such as octylamine, 2-ethylhexylamine, laurylamine, and stearylamine; nitrogen-containing heterocyclic compounds such as pyridine, 1,8-diazabicyclo[5,4,0]undecene-7 (DBU), and 1,5-diazabicyclo[4,3,0]nonene-5 (DBN); guanidines such as guanidine, phenylguanidine, and diphenylguanidine; biguanides such as butylbiguanide, 1-o-tolylbiguanide, and 1-phenylbiguanide; amino group-containing silane coupling agents; and ketimine compounds.

Specific examples of the carboxylic acid include acetic acid, propionic acid, butyric acid, 2-ethylhexanoic acid, lauric acid, stearic acid, oleic acid, linoleic acid, neodecanoic acid, and versatic acid.

Specific examples of the alkoxy metal include: titanium compounds such as tetrabutyl titanate, titanium tetrakis (acetylacetonate), and diisopropoxytitanium bis(ethyl acetoacetate); aluminum compounds such as aluminum tris (acetylacetonate) and diisopropoxyaluminum ethyl acetoacetate; and zirconium compounds such as zirconium tetrakis (acetylacetonate).

Examples of other silanol condensation catalysts which can be used include fluorine anion-containing compounds, photoacid generators, and photobase generators.

Two or more different silanol condensation catalysts may be used in combination. For example, the combined use of the amine compound and carboxylic acid as mentioned above can be expected to provide a reactivity-enhancing effect.

The content of the silanol condensation catalyst may be from 0.001 to 20 parts by weight, from 0.01 to 15 parts by weight, or from 0.01 to 10 parts by weight per 100 parts by weight of the total amount of the polyoxyalkylene polymer (A) and (meth)acrylic ester polymer (B). If the content of the silanol condensation catalyst is below 0.001 parts by weight, the reaction rate could be insufficient. If the content of the silanol condensation catalyst is above 20 parts by weight, the workability of the composition tends to deteriorate because an extremely high reaction rate shortens the time during which the composition remains usable, and the storage stability of the composition also tends to deteriorate. A silanol condensation catalyst could, after curing of the curable composition, seep to the surface of the cured product or smear the surface of the cured product. An approach to this situation is to limit the amount of the silanol condensation catalyst used to the range of 0.01 to 3.0 parts by weight. Doing so allows for maintenance of a good surface condition of the cured product without sacrifice of curability.

(Additional Components)

Additional components may be added to the curable composition of one or more embodiments of the present invention, and examples of the additional components include a silicon compound, an adhesion promoter, a plasticizer, a solvent, a diluent, a silicate, a filler, an anti-sagging agent, an antioxidant, a light stabilizer, an ultraviolet absorber, a property modifier, a tackifying resin, an epoxy group-containing compound, a photocurable material, an oxygen-curable material, a surface modifier, an epoxy resin, another resin, a flame retardant, and a foaming agent. Further, various additives may be added, if desired, to the curable composition of one or more embodiments of the present invention in order to adjust the physical properties of the curable composition or the cured product of the composition. Examples of the additives include a curability modifier, a radical inhibitor, a metal deactivator, an antiozonant, a phosphorus-based peroxide decomposer, a lubricant, a pigment, and a fungicide.

<Filler>

Various fillers can be added to the composition of one or more embodiments of the present invention. Examples of the fillers include heavy calcium carbonate, colloidal calcium carbonate, magnesium carbonate, diatomite, clay, talc, titanium oxide, fumed silica, precipitated silica, crystalline silica, molten silica, silicic anhydride, hydrated silicic acid, carbon black, ferric oxide, aluminum fines, zinc oxide, activated zinc oxide, PVC powder, PMMA powder, and glass fibers or filaments. One of such fillers may be used alone, or a mixture of two or more of the fillers may be used.

The amount of the filler used may be from 1 to 300 parts by weight or from 10 to 250 parts by weight per 100 parts by weight of the total amount of the polyoxyalkylene polymer (A) and (meth)acrylic ester polymer (B).

An organic or inorganic balloon may be added to reduce the weight (or reduce the specific gravity) of the composition. The balloon is a hollow spherical filler, and examples of the material of the balloon include: inorganic materials such as glass, Shirasu soil, and silica; and organic materials such as phenol resin, urea resin, polystyrene, and Saran. One of such balloons may be used alone, or a mixture of two or more of the balloons may be used.

The amount of the balloon used may be from 0.1 to 100 parts by weight or from 1 to 20 parts by weight per 100 parts by weight of the total amount of the polyoxyalkylene polymer (A) and (meth)acrylic ester polymer (B).

<Adhesion Promoter>

An adhesion promoter can be added to the composition of one or more embodiments of the present invention. A silane coupling agent or a reaction product of a silane coupling agent can be added as the adhesion promoter.

Specific examples of the silane coupling agent include: amino group-containing silanes such as 3-aminopropyltrimethoxysilane, 3-aminopropylmethyldimethoxysilane, N-(2-aminoethyl)-3-aminopropyltrimethoxysilane, N-(2-aminoethyl)-3-aminopropylmethyldimethoxysilane, N-phenyl-3-aminopropyltrimethoxysilane, and (2-aminoethyl) aminomethyltrimethoxysilane; isocyanate group-containing silanes such as (3-isocyanatopropyl)trimethoxysilane, (3-isocyanatopropyl)triethoxysilane, (3-isocyanatopropyl) methyl dimethoxysilane, (isocyanatomethyl)trimethoxysilane, and (isocyanatomethyl)dimethoxymethylsilane; mercapto group-containing silanes such as (3-mercaptopropyl) trimethoxysilane, (3-mercaptopropyl)triethoxysilane, and (3-mercaptopropyl)methyldimethoxysilane; and epoxy group-containing silanes such as (3-glycidoxypropyl) trimethoxysilane and 2-(3,4-epoxycyclohexyl)ethyltrimethoxysilane. Reaction products of the silane coupling agents can also be used. One of such adhesion promoters may be used alone, or a mixture of two or more of the adhesion promoters may be used.

The amount of the adhesion promoter used may be from 0.1 to 20 parts by weight or from 0.5 to 10 parts by weight per 100 parts by weight of the total amount of the polyoxyalkylene polymer (A) and (meth)acrylic ester polymer (B).

<Plasticizer>

A plasticizer can be added to the composition of one or more embodiments of the present invention. Specific examples of the plasticizer include: phthalic ester compounds such as dibutyl phthalate, diisononyl phthalate (DINP), diheptyl phthalate, di(2-ethylhexyl) phthalate, diisodecyl phthalate (DIDP), and butyl benzyl phthalate; terephthalic ester compounds such as bis(2-ethylhexyl)-1,4-benzenedicarboxylate; non-phthalic ester compounds such as diisononyl 1,2-cyclohexanedicarboxylate; aliphatic polyfunctional carboxylic ester compounds such as dioctyl adipate, dioctyl sebacate, dibutyl sebacate, diisodecyl succinate, and tributyl acetylcitrate; unsaturated fatty acid ester compounds such as butyl oleate and methyl acetyl ricinoleate; alkylsulfonic acid phenyl esters; phosphoric ester compounds; trimellitic ester compounds; chlorinated paraffin; hydrocarbon oils such as alkyl diphenyl and partially-hydrogenated terphenyl; process oil; and epoxy plasticizers such as epoxidized soybean oil and benzyl epoxystearate.

A polymeric plasticizer can also be used. Specific examples of the polymeric plasticizer include: vinyl polymers; polyester plasticizers; polyethers such as polyether polyols (e.g., polyethylene glycol and polypropylene glycol having a number-average molecular weight of 500 or more) and derivatives derived from conversion of the hydroxy groups of the polyether polyols to ester or ether groups;

polystyrenes; polybutadiene; polybutene; polyisobutylene; butadiene-acrylonitrile; and polychloroprene.

The amount of the plasticizer used may be from 5 to 150 parts by weight, from 10 to 120 parts by weight, or from 20 to 100 parts by weight per 100 parts by weight of the total amount of the polyoxyalkylene polymer (A) and (meth) acrylic ester polymer (B). If the amount of the plasticizer is below 5 parts by weight, the plasticizer cannot exhibit its effect. If the amount of the plasticizer is above 150 parts by weight, the mechanical strength of the cured product will be insufficient. One plasticizer may be used alone, or two or more plasticizers may be used in combination.

<Solvent and Diluent>

A solvent or diluent can be added to the composition of one or more embodiments of the present invention. The solvent or diluent used is not limited to a particular material, and may be an aliphatic hydrocarbon, an aromatic hydrocarbon, an alicyclic hydrocarbon, a halogenated hydrocarbon, an alcohol, an ester, a ketone, or an ether. In the case where a solvent or diluent is used, the boiling point of the solvent or diluent may be 150° C. or higher, 200° C. or higher, or 250° C. or higher to avoid air pollution during indoor use of the composition. One of the above-mentioned solvents or diluents may be used alone, or two or more of the solvents or diluents may be used in combination.

<Anti-Sagging Agent>

An anti-sagging agent may be added, if desired, to the composition of one or more embodiments of the present invention to prevent sagging and improve workability. The anti-sagging agent is not limited to a particular material, and examples of the anti-sagging agent include polyamide waxes, hydrogenated castor oil derivatives, and metallic soaps such as calcium stearate, aluminum stearate, and barium stearate. One of these anti-sagging agents may be used alone, or two or more of the anti-sagging agents may be used in combination.

The amount of the anti-sagging agent used may be from 0.1 to 20 parts by weight per 100 parts by weight of the total amount of the polyoxyalkylene polymer (A) and (meth) acrylic ester polymer (B).

<Antioxidant>

An antioxidant (anti-aging agent) can be used in the composition of one or more embodiments of the present invention. The use of an antioxidant can increase the weathering resistance of the cured product. Examples of the antioxidant include hindered phenol antioxidants, monophenol antioxidants, bisphenol antioxidants, and polyphenol antioxidants. Specific examples of the antioxidant are mentioned in Japanese Laid-Open Patent Application Publication No. H4-283259 and Japanese Laid-Open Patent Application Publication No. H9-194731.

The amount of the antioxidant used may be from 0.1 to 10 parts by weight or from 0.2 to 5 parts by weight per 100 parts by weight of the total amount of the polyoxyalkylene polymer (A) and (meth)acrylic ester polymer (B).

<Light Stabilizer>

A light stabilizer can be used in the composition of one or more embodiments of the present invention. The use of a light stabilizer can prevent photooxidative degradation of the cured product. Examples of the light stabilizer include benzotriazole, hindered amine, and benzoate compounds. Particularly preferred are hindered amine compounds.

The amount of the light stabilizer used may be from 0.1 to 10 parts by weight or from 0.2 to 5 parts by weight per 100 parts by weight of the total amount of the polyoxyalkylene polymer (A) and (meth)acrylic ester polymer (B).

<Ultraviolet Absorber>

An ultraviolet absorber can be used in the composition of one or more embodiments of the present invention. The use of an ultraviolet absorber can increase the surface weathering resistance of the cured product. Examples of the ultraviolet absorber include benzophenone, benzotriazole, salicylate, substituted tolyl, and metal chelate compounds. Particularly preferred are benzotriazole compounds, examples of which include those sold under the names Tinuvin P, Tinuvin 213, Tinuvin 234, Tinuvin 326, Tinuvin 327, Tinuvin 328, Tinuvin 329, and Tinuvin 571 (all of these are manufactured by BASF).

The amount of the ultraviolet absorber used may be from 0.1 to 10 parts by weight or from 0.2 to 5 parts by weight per 100 parts by weight of the total amount of the polyoxyalkylene polymer (A) and (meth)acrylic ester polymer (B).

<Property Modifier>

A property modifier may be added, if desired, to the curable composition of one or more embodiments of the present invention for the purpose of modifying the tensile properties of the resulting cured product. The property modifier is not limited to a particular material, and examples of the property modifier include: alkylalkoxysilanes such as phenoxytrimethylsilane, methyltrimethoxysilane, dimethyldimethoxysilane, trimethylmethoxysilane, and n-propyltrimethoxysilane; arylalkoxysilanes such as diphenyldimethoxysilane and phenyltrimethoxysilane; alkylisopropenoxysilanes such as dimethyldiisopropenoxysilane, methyltriisopropenoxysilane, and γ-glycidoxypropylmethyldiisopropenoxysilane; trialkylsilyl borates such as tris(trimethylsilyl) borate and tris(triethylsilyl) borate; silicone varnishes; and polysiloxanes. The use of the property modifier can increase the hardness of the cured product of the composition of one or more embodiments of the present invention or conversely decrease the hardness and increase the elongation at break. One of the above-mentioned property modifiers may be used alone, or two or more of the property modifiers may be used in combination.

In particular, a compound hydrolyzable to form a compound having a monovalent silanol group in the molecule has the advantage of decreasing the modulus of the cured product without aggravating the stickiness of the surface of the cured product. Particularly preferred is a compound the hydrolysis of which gives trimethylsilanol. Examples of the compound hydrolyzable to form a compound having a monovalent silanol group in the molecule include silicon compounds which are derivatives of alcohols such as hexanol, octanol, phenol, trimethylolpropane, glycerin, pentaerythritol, and sorbitol and the hydrolysis of which gives monosilanols.

The amount of the property modifier used may be from 0.1 to 10 parts by weight or from 0.5 to 5 parts by weight per 100 parts by weight of the total amount of the polyoxyalkylene polymer (A) and (meth)acrylic ester polymer (B).

<Tackifying Resin>

A tackifying resin can be added, if desired, to the composition of one or more embodiments of the present invention for the purpose of increasing the bond strength or adhesion to a substrate or any other purpose. The tackifying resin used is not limited to a particular type, and may be a commonly used tackifying resin.

Specific examples of the tackifying resin include terpene resins, aromatic modified terpene resins, hydrogenated terpene resins, terpene-phenol resins, phenol resins, modified phenol resins, xylene-phenol resins, cyclopentadiene-phenol resins, coumarone-indene resins, rosin resins, rosin ester resins, hydrogenated rosin ester resins, xylene resins, lowmolecular-weight polystyrene resins, styrene copolymer resins, styrene block copolymers, hydrogenated styrene block copolymers, petroleum resins (such as C5 hydrocarbon resins, C9 hydrocarbon resins, and C5-C9 hydrocarbon copolymer resins), hydrogenated petroleum resins, and DCPD resins. One of these resins may be used alone, or two or more of the resins may be used in combination.

The amount of the tackifying resin used may be from 2 to 100 parts by weight, from 5 to 50 parts by weight, or from 5 to 30 parts by weight per 100 parts by weight of the total amount of the polyoxyalkylene polymer (A) and (meth)acrylic ester polymer (B).

<Epoxy Group-Containing Compound>

An epoxy group-containing compound can be used in the composition of one or more embodiments of the present invention. Examples of the epoxy group-containing compound include epoxidized unsaturated fats and oils, epoxidized unsaturated fatty acid esters, alicyclic epoxy compounds, epichlorohydrin derivatives, and mixtures of the derivatives. Specific examples include epoxidized soybean oil, epoxidized linseed oil, bis(2-ethylhexyl)-4,5-epoxycyclohexane-1,2-dicarboxylate (E-PS), epoxy octyl stearate, and epoxy butyl stearate. It is recommended that the epoxy compound be used in an amount of 0.5 to 50 parts by weight per 100 parts by weight of the total amount of the polyoxyalkylene polymer (A) and (meth)acrylic ester polymer (B).

<Photocurable Material>

A photocurable material can be used in the composition of one or more embodiments of the present invention. The use of a photocurable material can lead to the formation of a coating of the photocurable material on the surface of the cured product, resulting in reduction in stickiness of the cured product or increase in weathering resistance of the cured product. A wide variety of such compounds are known, including organic monomers, oligomers, resins, and compositions containing these. Typical examples of photocurable materials which can be used include: an unsaturated acrylic compound which is a monomer or an oligomer having one or more unsaturated acrylic or methacrylic groups or a mixture of the monomer and oligomer; polyvinyl cinnamates; and azide resins.

The amount of the photocurable material used may be from 0.1 to 20 parts by weight or from 0.5 to 10 parts by weight per 100 parts by weight of the total amount of the polyoxyalkylene polymer (A) and (meth)acrylic ester polymer (B).

<Oxygen-Curable Material>

An oxygen-curable material can be used in the composition of one or more embodiments of the present invention. Examples of the oxygen-curable material include unsaturated compounds reactive with oxygen in the air. The oxygen-curable material reacts with oxygen in the air to form a cured coating in the vicinity of the surface of the cured product, thus offering benefits such as preventing the surface of the cured product from becoming sticky and preventing deposition of dirt and dust on the surface of the cured product. Specific examples of the oxygen-curable material include: drying oils exemplified by tung oil and linseed oil; various alkyd resins resulting from modification of the drying oil compounds; drying oil-modified acrylic polymers, epoxy resins, and silicone resins; and liquid polymers such as 1,2-polybutadiene, 1,4-polybutadiene, and C5 to C8 diene polymers which are obtained by polymerization or copolymerization of diene compounds such as butadiene, chloroprene, isoprene, and 1,3-pentadiene. One of these oxygen-curable materials may be used alone, or two or more of the oxygen-curable materials may be used in combination.

The amount of the oxygen-curable material used may be from 0.1 to 20 parts by weight or from 0.5 to 10 parts by weight per 100 parts by weight of the total amount of the polyoxyalkylene polymer (A) and (meth)acrylic ester polymer (B). It is recommended that the oxygen-curable material be used together with a photocurable material as taught in Japanese Laid-Open Patent Application Publication No. H3-160053.

<Epoxy Resin>

An epoxy resin can also be used in the composition of one or more embodiments of the present invention. The composition containing an epoxy resin is suitable especially for use as an adhesive, in particular an adhesive for exterior wall tiles. Examples of the epoxy resin include bisphenol A epoxy resins and novolac epoxy resins.

As for the ratio between the amount of the epoxy resin and the total amount of the polyoxyalkylene polymer (A) and (meth)acrylic ester polymer (B), the [(A)+(B)]/epoxy resin weight ratio is in the range of 100/1 to 1/100. If the [(A)+(B)]/epoxy resin weight ratio is below 1/100, the improving effect on the impact resistance and toughness of the epoxy resin cured product will be lessened. If the [(A)+(B)]/epoxy resin weight ratio is above 100/1, the strength of the cured product will be insufficient.

In the case where the epoxy resin is added to the composition of one or more embodiments of the present invention, a curing agent for curing the epoxy resin can also be used in the composition. The epoxy resin curing agent used is not limited to a particular type, and may be a commonly used epoxy resin curing agent.

In the case where a curing agent for curing the epoxy resin is used, the amount of the curing agent used may be in the range of 0.1 to 300 parts by weight per 100 parts by weight of the epoxy resin.

<<Preparation of Curable Composition>>

The curable composition of one or more embodiments of the present invention can be prepared as a one-part composition all the components of which are blended together and hermetically stored and which cures under the action of moisture in the air. The curable composition of one or more embodiments of the present invention can be prepared also as a two-part composition consisting of a resin composition and a curing agent which is prepared separately from the resin composition by blending components such as a silanol condensation catalyst, a filler, a plasticizer, and water. In the case of this two-part composition, the resin composition and the curing agent are mixed before use. In terms of workability, the curable composition of one or more embodiments of the present may be prepared as a one-part composition.

In the case where the curable composition is a one-part composition, all the components are blended together beforehand. Thus, it is preferable that a water-containing component be dried to remove water before use or dehydrated by a manipulation such as pressure reduction during blending or kneading. The storage stability of the composition can be further improved by not only performing the drying/dehydration process but also adding an alkoxysilane compound such as n-propyltrimethoxysilane, vinyltrimethoxysilane, vinylmethyldimethoxysilane, γ-mercaptopropylmethyldimethoxysilane, γ-mercaptopropylmethyldiethoxysilane, or γ-glycidoxypropyltrimethoxysilane.

In the case of using a dehydration agent, in particular a water-reactive silicon compound such as vinyltrimethoxysilane, the amount of the compound used as the dehydration agent may be from 0.1 to 20 parts by weight or from 0.5 to 10 parts by weight per 100 parts by weight of the total amount of the polyoxyalkylene polymer (A) and (meth) acrylic ester polymer (B).

Applications

The curable composition of one or more embodiments of the present invention can be used as a pressure-sensitive adhesive, a sealing material for use in buildings, ships, automobiles, and roads, an adhesive, a waterproofing material, a coating-waterproofing material, a mold making material, a vibration-isolating material, a vibration-damping material, a soundproofing material, a foam material, a paint, or a spray material. Since a cured product resulting from curing of the curable composition of one or more embodiments of the present invention has excellent flexibility and bond strength, the curable composition is suitable for use as a sealing material or an adhesive.

The curable composition of one or more embodiments of the present invention can be used in diverse products, including: a material for use in an electrical or electronic part, such as a sealant for the back surface of a solar cell; an electrical insulating material of an electrical or electronic part or device, such as an insulating sheath material for an electric wire or cable; an acoustic insulating material; an elastic adhesive; a binder; a contact adhesive; a spray-type sealing material; a crack-repairing material; an adhesive for tile laying; an adhesive for an asphalt-waterproofing material; a powder paint; a cast molding material; a rubber material for medical purposes; a pressure-sensitive adhesive for medical purposes; a pressure-sensitive adhesive sheet for medical purposes; a medical device sealing material; a dental impression material; a food packaging material; a joint sealing material for exterior cladding such as siding board; a coating material; an anti-skid covering material; a buffer material; a primer; an electrically conductive material for electromagnetic wave shielding; a thermally conductive material; a hot-melt material; a potting agent for electrical or electronic purposes; a film; a gasket; a concrete-reinforcing material; an adhesive for temporary bonding; any kind of molding material; a rust-proofing or waterproofing sealant for an edge face (cut edge) of wire glass or laminated glass; and a liquid sealing material for use in industrial parts such as parts of automobiles, large vehicles (e.g., cargo trucks and buses), railroad cars, aircrafts, ships, electric machines, and various other mechanical machines. For example, in an automobile, the curable composition of one or more embodiments of the present invention can be used for diverse purposes such as adhesive mounting of various parts such as a plastic cover, a trim, a flange, a bumper, a window, and interior and exterior parts. Further, the curable composition can, alone or with the help of a primer, adhere to a wide variety of substrates such as glass, porcelain, wood, metal, and a resin molded article, and thus can be used as any of various types of sealing compositions and adhesive compositions. Additionally, the curable composition of one or more embodiments of the present invention can be used as an adhesive for interior panels, an adhesive for exterior panels, an adhesive for tile laying, an adhesive for stone laying, an adhesive for ceiling finishing, an adhesive for floor finishing, an adhesive for wall finishing, an adhesive for vehicle panels, an adhesive for assembly of electrical, electronic, or precision equipment, an adhesive for bonding of leather, fiber products, fabric, paper, plates, or rubber, a reactive, post-curable pressure-sensitive adhesive, a sealing material for direct glazing, a sealing material for double-glazed glass, a sealing material for SSG, a sealing material for working joints of buildings, or a material for civil engineering or bridge construction. The curable composition can be used also as a pressure-sensitive adhesive material such as a pressure-sensitive adhesive tape or sheet.

EXAMPLES

Hereinafter, one or more embodiments of the present invention will be described in more detail using examples. One or more embodiments of the present invention are not limited to the examples described below.

In the examples, the number-average molecular weights are GPC molecular weights measured under the following conditions.

Delivery system: HLC-8220 GPC manufactured by Tosoh Corporation
Column: TSKgel Super H series manufactured by Tosoh Corporation
Solvent: THF
Molecular weight: Polystyrene equivalent
Measurement temperature: 40° C.

(Method of Calculating Average Ratio of Number of Reactive Silyl Groups to Number of Ends of Polyoxyalkylene Polymer Backbone)

The average ratio was calculated by multiplying the "number of groups (e.g., olefin groups) at which reactive silyl groups are introducible per end of polyoxyalkylene polymer backbone" by the "reactive silyl group introduction ratio".

For example, in the case of using a method in which the olefin group-containing epoxy compound (E2) is reacted with the hydroxy groups of the polyoxyalkylene polymer (C) and then the resulting polymer is reacted with the olefin group-containing organic halide (E1) to produce the polyoxyalkylene polymer (A), the "number of groups at which reactive silyl groups are introducible per end of polyoxyalkylene polymer backbone" can be calculated as the sum of the molar ratio of the reacted epoxy compound (E2) to the hydroxy groups of the polyoxyalkylene polymer (C) and the molar ratio of the reacted organic halide (E1) to the hydroxy groups of the polyoxyalkylene polymer (C).

The "reactive silyl group introduction ratio" was determined by subjecting the reactive silyl group-containing polyoxyalkylene polymer (A) to $^1$H NMR analysis and by making a calculation according to the following equation using integrals of signals representing the different groups of concern: [Number of moles of reactive silyl groups]/[Total number of moles of reactive silyl groups, groups (e.g., terminal olefin groups) at which reactive silyl groups are introducible but which remain without undergoing introduction of reactive silyl groups, and groups (e.g., internal olefin groups) resulting from isomerization of terminal olefin groups) resulting from modification of groups at which reactive silyl groups are introducible].

Hereinafter, the "average ratio of the number of reactive silyl groups to the number of ends of polyoxyalkylene polymer backbone" will be referred to as the "silyl group/ backbone end number ratio".

(Method of Calculating Average Number Per (Meth)Acrylic Ester Polymer Molecule of Reactive Silyl Groups Bonded at Ends of or Inside Polymer Backbone)

The average numbers were calculated based on the reactive silyl group concentration in the polymer and the number-average molecular weight of the polymer. The reactive silyl group concentration was calculated from the amounts of the reactive silyl group-containing monomer and reactive silyl group-containing chain transfer agent used, and the number-average molecular weight was measured by GPC. More specifically, the average numbers were calculated using equations given below. Hereinafter, the "average number per (meth)acrylic ester polymer molecule of reactive silyl groups bonded at ends of the polymer backbone" will be referred to as the "number of terminally bonded silyl groups", and the "average number per (meth)acrylic ester polymer molecule of reactive silyl groups bonded inside the polymer backbone" will be referred to as the "number of internally bonded silyl groups".

Number of terminally bonded silyl groups=(number-average molecular weight of polymer/total parts by weight of solids in polymer synthesis)×[sum of values of (parts by weight)/(molecular weight) calculated respectively for reactive silyl group-containing chain transfer agents used]

Number of internally bonded silyl groups=(number-average molecular weight of polymer/total parts by weight of solids in polymer synthesis)×[sum of values of (parts by weight)/(molecular weight) calculated respectively for reactive silyl group-containing monomers used]

(Synthesis Example 1-1) Polymer (C-1)

Propylene oxide was polymerized using polyoxypropylene diol having a number-average molecular weight of about 4,500 as an initiator in the presence of a zinc hexacyanocobaltate-glyme complex catalyst. The polymerization was carried out until the molecular weight indicated below was reached. As a result, linear, hydroxy-terminated polyoxypropylene (C-1) having a number-average molecular weight of about 28,000 was obtained.

(Synthesis Example 1-2) Polymer (C-2)

Propylene oxide was polymerized using polyoxypropylene diol having a number-average molecular weight of about 4,500 as an initiator in the presence of a zinc hexacyanocobaltate-glyme complex catalyst. The polymerization was carried out until the molecular weight indicated below was reached. As a result, linear, hydroxy-terminated polyoxypropylene (C-2) having a number-average molecular weight of about 15,000 was obtained.

(Synthesis Example 1-3) Polymer (C-3)

Propylene oxide was polymerized using polyoxypropylene triol having a number-average molecular weight of about 4,500 as an initiator in the presence of a zinc hexacyanocobaltate-glyme complex catalyst. The polymerization was carried out until the molecular weight indicated below was reached. As a result, branched, hydroxy-terminated polyoxypropylene (C-3) having a number-average molecular weight of about 26,000 was obtained.

(Synthesis Example 1-4) Polymer (C-4)

Propylene oxide was polymerized using polyoxypropylene diol having a number-average molecular weight of about 4,500 as an initiator in the presence of a zinc hexacyanocobaltate-glyme complex catalyst. The polymerization was carried out until the molecular weight indicated below was reached. As a result, linear, hydroxy-terminated polyoxypropylene (C-4) having a number-average molecular weight of about 21,000 was obtained.

(Synthesis Example 2-1) Polymer (A-1)

1.2 equivalents of sodium methoxide dissolved in methanol was added to the polymer (C-1) per equivalent of the hydroxy groups of the polymer (C-1). Methanol was distilled off at 140° C., and 1.6 equivalents of 3-chloro-2-methyl-1-propene was added to convert the terminal hydroxy groups to methallyl groups. To 100 parts by weight of the resulting methallyl-terminated polyoxypropylene were added a solution of 100 ppm of a platinum-divinyldisiloxane complex (isopropyl alcohol solution with a concentration of 3% by mass calculated as the platinum content), a solution of 100 ppm of sulfur (hexane solution with a concentration of 0.25% by weight), and 2.3 parts by weight of (methoxymethyl)dimethoxysilane. The reaction was allowed to proceed at 100° C. until the amount of the remaining methallyl groups decreased to less than 1% of the initial amount of the methallyl groups at the start of the reaction. Excess materials such as (methoxymethyl)dimethoxysilane were removed by devolatilization under reduced pressure to give linear polyoxypropylene (A-1) terminated by (methoxymethyl)dimethoxysilyl groups and having a silyl group/backbone end number ratio of 0.95 and a number-average molecular weight of 28,000.

(Synthesis Example 2-2) Polymer (A-2)

1.0 equivalents of sodium methoxide dissolved in methanol was added to the polymer (C-1) per equivalent of the hydroxy groups of the polymer (C-1). Methanol was distilled off at 140° C., and 1.0 equivalents of allyl glycidyl ether was added at 140° C. The reaction was allowed to proceed for 2 hours to introduce a structure containing an allyl group and a hydroxy group, and 1.5 equivalents of 3-chloro-1-propene was further added to convert the hydroxy groups to allyl groups. To 100 parts by weight of the resulting allyl-terminated polyoxypropylene were added 36 ppm of a platinum-divinyldisiloxane complex (isopropyl alcohol solution with a concentration of 3% by mass calculated as the platinum content) and 2.1 parts by weight of (methoxymethyl)dimethoxysilane. The reaction was allowed to proceed at 90° C. for 2 hours to give linear polyoxypropylene (A-2) terminated by (methoxymethyl) dimethoxysilyl groups and having a silyl group/backbone end number ratio of 1.50 and a number-average molecular weight of 28,000.

(Synthesis Example 2-3) Polymer (A-3)

1.2 equivalents of sodium methoxide dissolved in methanol was added to the polymer (C-1) per equivalent of the hydroxy groups of the polymer (C-1). Methanol was distilled off at 140° C., and 1.6 equivalents of 3-chloro-1-propene was added to convert the terminal hydroxy groups to allyl groups. To 100 parts by weight of the resulting allyl-terminated polyoxypropylene were added 36 ppm of a platinum-divinyldisiloxane complex (isopropyl alcohol solution with a concentration of 3% by mass calculated as the platinum content) and 1.1 parts by weight of (methoxymethyl)dimethoxysilane. The reaction was allowed to proceed at 90° C. for 2 hours to give linear polyoxypropylene (A-3) terminated by (methoxymethyl)dimethoxysilyl groups and having a silyl group/backbone end number ratio of 0.75 and a number-average molecular weight of 28,000.

(Synthesis Example 2-4) Polymer (A-4)

1.0 equivalents of sodium methoxide dissolved in methanol was added to the polymer (C-1) per equivalent of the hydroxy groups of the polymer (C-1). Methanol was distilled off at 140° C., and 1.0 equivalents of allyl glycidyl ether was added at 140° C. The reaction was allowed to proceed for 2 hours to introduce a structure containing an allyl group and a hydroxy group, and 1.5 equivalents of 3-chloro-1-propene was further added to convert the hydroxy groups to allyl groups. To 100 parts by weight of the resulting allyl-terminated polyoxypropylene were added 36 ppm of a platinum-divinyldisiloxane complex (isopropyl alcohol solution with a concentration of 3% by mass calculated as the platinum content) and 1.7 parts by weight of methyldimethoxysilane. The reaction was allowed to proceed at 90° C. for 2 hours to give linear polyoxypropylene (A-4) terminated by methyldimethoxysilyl groups and having a silyl group/backbone end number ratio of 1.50 and a number-average molecular weight of 28,000.

(Synthesis Example 2-5) Polymer (A-5)

1.2 equivalents of sodium methoxide dissolved in methanol was added to the polymer (C-1) per equivalent of the hydroxy groups of the polymer (C-1). Methanol was distilled off at 140° C., and 1.6 equivalents of 3-chloro-1-propene was added to convert the terminal hydroxy groups to allyl groups. To 100 parts by weight of the resulting allyl-terminated polyoxypropylene were added 36 ppm of a platinum-divinyldisiloxane complex (isopropyl alcohol solution with a concentration of 3% by mass calculated as the platinum content) and 0.95 parts by weight of methyldimethoxysilane. The reaction was allowed to proceed at 90° C. for 2 hours to give linear polyoxypropylene (A-5) terminated by methyldimethoxysilyl groups and having a silyl group/backbone end number ratio of 0.75 and a number-average molecular weight of 28,000.

(Synthesis Example 2-6) Polymer (A-6)

1.2 equivalents of sodium methoxide dissolved in methanol was added to the polymer (C-1) per equivalent of the hydroxy groups of the polymer (C-1). Methanol was distilled off at 140° C., and 1.6 equivalents of 3-chloro-1-propene was added to convert the terminal hydroxy groups to allyl groups. To 100 parts by weight of the resulting allyl-terminated polyoxypropylene were added 50 ppm of a platinum-divinyldisiloxane complex (isopropyl alcohol solution with a concentration of 3% by mass calculated as the platinum content) and 1.1 parts by weight of trimethoxysilane. The reaction was allowed to proceed at 90° C. for 2 hours to give linear polyoxypropylene (A-6) terminated by trimethoxysilyl groups and having a silyl group/backbone end number ratio of 0.80 and a number-average molecular weight of 28,000.

(Synthesis Example 2-7) Polymer (A-7)

1.0 equivalents of sodium methoxide dissolved in methanol was added to the polymer (C-1) per equivalent of the hydroxy groups of the polymer (C-1). Methanol was distilled off at 140° C., and 1.0 equivalents of allyl glycidyl ether was added at 140° C. The reaction was allowed to proceed for 2 hours to introduce a structure containing an allyl group and a hydroxy group, and 1.5 equivalents of 3-chloro-1-propene was further added to convert the hydroxy groups to allyl groups. To 100 parts by weight of the resulting allyl-terminated polyoxypropylene were added 50 ppm of a platinum-divinyldisiloxane complex (isopropyl alcohol solution with a concentration of 3% by mass calculated as the platinum content) and 1.9 parts by weight of trimethoxysilane. The reaction was allowed to proceed at 90° C. for 2 hours to give linear polyoxypropylene (A-7) terminated by trimethoxysilyl groups and having a silyl group/backbone end number ratio of 1.50 and a number-average molecular weight of 28,000.

(Synthesis Example 2-8) Polymer (A-8)

To 100 parts by weight of the polymer (C-2) were added 50 ppm of a mercapto-containing tin catalyst (U-360 manufactured by Nitto Kasei Co., Ltd.) and 3.1 parts by weight of (isocyanatomethyl)dimethoxymethylsilane. The reaction was allowed to proceed at 90° C. for 2 hours to give linear polyoxypropylene (A-8) terminated by methyldimethoxysilyl groups and having a silyl group/backbone end number ratio of 0.90 and a number-average molecular weight of 15,000.

(Synthesis Example 2-9) Polymer (A-9)

1.2 equivalents of sodium methoxide dissolved in methanol was added to the polymer (C-3) per equivalent of the hydroxy groups of the polymer (C-3). Methanol was distilled off at 140° C., and 1.6 equivalents of 3-chloro-2-methyl-1-propene was added to convert the terminal hydroxy groups to methallyl groups. To 100 parts by weight of the resulting methallyl-terminated polyoxypropylene were added a solution of 100 ppm of a platinum-divinyldisiloxane complex (isopropyl alcohol solution with a concentration of 3% by mass calculated as the platinum content), a solution of 100 ppm of sulfur (hexane solution with a concentration of 0.25% by weight), and 2.4 parts by weight of (methoxymethyl)dimethoxysilane. The reaction was allowed to proceed at 100° C. until the amount of the remaining methallyl groups decreased to less than 1% of the initial amount of the methallyl groups at the start of the reaction. Excess materials such as (methoxymethyl)dimethoxysilane were removed by devolatilization under reduced pressure to give linear polyoxypropylene (A-9) terminated by (methoxymethyl)dimethoxysilyl groups and having a silyl group/backbone end number ratio of 0.95 and a number-average molecular weight of 26,000.

(Synthesis Example 2-10) Polymer (A-10)

1.0 equivalents of sodium methoxide dissolved in methanol was added to the polymer (C-2) per equivalent of the hydroxy groups of the polymer (C-2). Methanol was distilled off at 140° C., and 1.0 equivalents of allyl glycidyl ether was added at 140° C. The reaction was allowed to proceed for 2 hours to introduce a structure containing an allyl group and a hydroxy group, and 1.5 equivalents of 3-chloro-1-propene was further added to convert the hydroxy groups to allyl groups. To 100 parts by weight of the resulting allyl-terminated polyoxypropylene were added 36 ppm of a platinum-divinyldisiloxane complex (isopropyl alcohol solution with a concentration of 3% by mass calculated as the platinum content) and 3.4 parts by weight of methyldimethoxysilane. The reaction was allowed to proceed at 90° C. for 2 hours to give linear polyoxypropylene (A-10) terminated by methyldimethoxysilyl groups and having a silyl group/backbone end number ratio of 1.60 and a number-average molecular weight of 15,000.

(Synthesis Example 2-11) Polymer (A-11)

1.2 equivalents of sodium methoxide dissolved in methanol was added to the polymer (C-2) per equivalent of the hydroxy groups of the polymer (C-2). Methanol was distilled off at 140° C., and 1.6 equivalents of 3-chloro-1-propene was added to convert the terminal hydroxy groups to allyl groups. To 100 parts by weight of the resulting allyl-terminated polyoxypropylene were added 6.7 parts by weight of (3-mercaptopropyl)methyldimethoxysilane and 0.15 parts by weight of 2,2'-azobis(2-methylbutyronitrile). The temperature of the mixture was adjusted to 90° C. and the reaction was allowed to proceed for 6 hours, during which 0.15 parts by weight of 2,2'-azobis(2-methylbutyronitrile) was added two times at 2 and 4 hours after the start of the reaction. Excess materials such as (3-mercaptopropyl) methyldimethoxysilane were removed by devolatilization under reduced pressure to give linear polyoxypropylene (A-11) terminated by methyldimethoxysilyl groups and having a silyl group/backbone end number ratio of 0.95 and a number-average molecular weight of 15,000.

(Synthesis Example 2-12) Polymer (A-12)

1.2 equivalents of sodium methoxide dissolved in methanol was added to the polymer (C-1) per equivalent of the hydroxy groups of the polymer (C-1). Methanol was distilled off at 140° C., and 1.6 equivalents of 3-chloro-2-methyl-1-propene was added to convert the terminal hydroxy groups to methallyl groups. To 100 parts by weight of the resulting methallyl-terminated polyoxypropylene were added a solution of 100 ppm of a platinum-divinyldisiloxane complex (isopropyl alcohol solution with a concentration of 3% by mass calculated as the platinum content), a solution of 100 ppm of sulfur (hexane solution with a concentration of 0.25% by weight), and 2.3 parts by weight of methyldimethoxysilane. The reaction was allowed to proceed at 100° C. until the amount of the remaining methallyl groups decreased to less than 1% of the initial amount of the methallyl groups at the start of the reaction. Excess materials such as methyldimethoxysilane were removed by devolatilization under reduced pressure to give linear polyoxypropylene (A-12) terminated by methyldimethoxysilyl groups and having a silyl group/backbone end number ratio of 0.95 and a number-average molecular weight of 28,000.

(Synthesis Example 2-13) Polymer (A-13)

1.2 equivalents of sodium methoxide dissolved in methanol was added to the polymer (C-4) per equivalent of the hydroxy groups of the polymer (C-4). Methanol was distilled off at 140° C., and 1.6 equivalents of 3-chloro-2-methyl-1-propene was added to convert the terminal hydroxy groups to methallyl groups. To 100 parts by weight of the resulting methallyl-terminated polyoxypropylene were added a solution of 100 ppm of a platinum-divinyldisiloxane complex (isopropyl alcohol solution with a concentration of 3% by mass calculated as the platinum content), a solution of 100 ppm of sulfur (hexane solution with a concentration of 0.25% by weight), and 3.0 parts by weight of (methoxymethyl)dimethoxysilane. The reaction was allowed to proceed at 100° C. until the amount of the remaining methallyl groups decreased to less than 1% of the initial amount of the methallyl groups at the start of the reaction. Excess materials such as (methoxymethyl)dimethoxysilane were removed by devolatilization under reduced pressure to give linear polyoxypropylene (A-13) terminated by (methoxymethyl)dimethoxysilyl groups and having a silyl group/backbone end number ratio of 0.95 and a number-average molecular weight of 21,000.

(Synthesis Example 2-14) Polymer (A-14)

To 100 parts by weight of the polymer (C-1) were added 50 ppm of a mercapto-containing tin catalyst (U-360 manufactured by Nitto Kasei Co., Ltd.) and 2.1 parts by weight of 3-isocyanatopropyltrimethoxysilane (Silquest A-Link 35 manufactured by Momentive Performance Materials Inc.). The reaction was allowed to proceed at 90° C. for 2 hours to give linear polyoxypropylene (A-14) terminated by trimethoxysilyl groups and having a silyl group/backbone end number ratio of 0.85 and a number-average molecular weight of 28,000.

Synthesis Example 3-1

A four-necked flask equipped with a stirrer was charged with 57.2 parts by weight of isobutyl alcohol, which was heated to 105° C. under nitrogen atmosphere. To the heated isobutyl alcohol was added dropwise over 3.5 hours a liquid mixture prepared by dissolving 78.3 parts by weight of methyl methacrylate, 6.7 parts by weight of butyl acrylate, 15.0 parts by weight of stearyl methacrylate, 10.0 parts by weight of (3-mercaptopropyl)methyldimethoxysilane, and 0.35 parts by weight of 2,2'-azobis(2-methylbutyronitrile) in 16.3 parts by weight of isobutyl alcohol. Polymerization was allowed to proceed at 105° C. for 2 hours to give an isobutyl alcohol solution (solid content=60% by weight) of a (meth) acrylic ester polymer (B-1) having a number-average molecular weight of 1,950 and a weight-average molecular weight of 3,400. In the polymer (B-1), the number of terminally bonded silyl groups was 0.98, and the number of internally bonded silyl groups was 0.

Synthesis Examples 3-2 to 3-20

Isobutyl alcohol solutions of (meth)acrylic ester polymers (B-2) to (B-20) were obtained in the same manner as the isobutyl alcohol solution of the polymer (B-1) in Synthesis Example 3-1, except that the monomers, chain transfer agents, radical initiator, and solvent were used in the proportions shown in Table 1. For each of the polymers (B) obtained, the number of terminally bonded silyl groups, the number of internally bonded silyl groups, the number-average molecular weight, the weight-average molecular weight, and the solids concentration are listed in Table 1.

TABLE 1

| | | Synthesis Example 3-1 | Synthesis Example 3-2 | Synthesis Example 3-3 | Synthesis Example 3-4 | Synthesis Example 3-5 | Synthesis Example 3-6 | Synthesis Example 3-7 | Synthesis Example 3-8 | Synthesis Example 3-9 | Synthesis Example 3-10 |
|---|---|---|---|---|---|---|---|---|---|---|---|
| | Polymer | B-1 | B-2 | B-3 | B-4 | B-5 | B-6 | B-7 | B-8 | B-9 | B-10 |
| | | \multicolumn{10}{c}{Polymerization material proportions (parts by weight)} | | | | | | | | | |
| Initial solvent | Isobutyl alcohol | 57.2 | 39.1 | 43.8 | 53.7 | 57.2 | 47.8 | 40.2 | 41.5 | 39.3 | 53.7 |
| Monomer | Methyl methacrylate | 78.3 | 72.7 | 72.9 | 77.8 | 74.5 | 65.0 | 80.0 | 80.0 | 79.0 | 76.8 |
| | Butyl acrylate | 6.7 | 6.7 | 6.5 | 6.7 | | | | | 0.5 | 6.7 |
| | Butyl methacrylate | | | | | | | | | | |
| | 2-Ethylhexyl acrylate | | | | | 24.0 | 24.0 | | | | |
| | Stearyl methacrylate | 15.0 | 14.6 | 14.6 | 15.0 | 1.0 | 1.0 | 20.0 | 20.0 | 20.0 | 15.0 |
| | 3-(Methyl-dimethosysilyl)propyl methacrylate | | 6.0 | 6.0 | 0.5 | | | | | 0.5 | 1.5 |
| | 3-(Trimethoxysilyl)propyl methacrylate | | | | | 0.5 | 10.0 | | | | |
| Chain transfer agent | (3-Mercaptopropyl)methyl-dimethoxysilane | 10.0 | 9.5 | 7.9 | 10.0 | | | | | 10.0 | 10.0 |
| | (3-Mercaptopropyl)trimethosysilane | | | | | 10.0 | 7.3 | 10.8 | 13.5 | | |
| | n-Dodecyl mercaptan | | | | | | | | | | |
| Radical initiator | 2,2'-azobis(2-methyl-butyronitrile) | 0.35 | 0.35 | 2.70 | 0.35 | 0.35 | 1.80 | 0.35 | 0.35 | 0.35 | 0.35 |
| Solvent | Isobutyl alcohol | 16.3 | 8.0 | 29.9 | 19.8 | 16.3 | 24.9 | 7.5 | 7.3 | 8.0 | 19.8 |
| | | \multicolumn{10}{c}{Polymer properties} | | | | | | | | | |
| Number of terminally bonded silyl groups in polymer (B) | | 0.98 | 0.94 | 0.77 | 0.95 | 0.92 | 0.76 | 0.94 | 0.97 | 0.98 | 0.93 |
| Number of internally bonded silyl groups in polymer (B) | | 0.00 | 0.46 | 0.46 | 0.04 | 0.04 | 0.83 | 0.00 | 0.00 | 0.04 | 0.11 |
| Number-average molecular weight | | 1950 | 1950 | 1950 | 1900 | 2000 | 2250 | 1900 | 1600 | 1950 | 1850 |
| Weight-average molecular weight | | 3400 | 3500 | 3450 | 3400 | 3450 | 4000 | 3450 | 2850 | 3450 | 3350 |
| Solids concentration | | 60% | 70% | 60% | 60% | 60% | 60% | 70% | 70% | 70% | 60% |

| | | Synthesis Example 3-11 | Synthesis Example 3-12 | Synthesis Example 3-13 | Synthesis Example 3-14 | Synthesis Example 3-15 | Synthesis Example 3-16 | Synthesis Example 3-17 | Synthesis Example 3-18 | Synthesis Example 3-19 | Synthesis Example 3-20 |
|---|---|---|---|---|---|---|---|---|---|---|---|
| | Polymer | B-11 | B-12 | B-13 | B-14 | B-15 | B-16 | B-17 | B-18 | B-19 | B-20 |
| | | \multicolumn{10}{c}{Polymerization material proportions (parts by weight)} | | | | | | | | | |
| Initial solvent | Isobutyl alcohol | 39.3 | 53.7 | 45.0 | 38.9 | 44.7 | 44.7 | 45.0 | 41.5 | 41.5 | 42.8 |
| Monomer | Methyl methacrylate | 75.8 | 74.7 | 77.5 | 65.7 | 80.0 | 80.0 | 78.4 | 79.0 | 40.0 | 80.0 |
| | Butyl acrylate | 6.7 | 6.7 | 6.9 | 6.7 | | | 7.0 | 0.5 | | |
| | Butyl methacrylate | | | | | | | | | 40.0 | |
| | 2-Ethylhexyl acrylate | | | | | | | | | | |
| | Stearyl methacrylate | 15.0 | 15.0 | 14.6 | 15.0 | 20.0 | 20.0 | 14.6 | 20.0 | 20.0 | 20.0 |
| | 3-(Methyl)-dimethosysilyl propyl methacrylate | 2.5 | 3.6 | | 12.6 | | | | 0.5 | | |
| | 3-(Trimethoxysilyl)propyl methacrylate | | | | | | | | | | |
| Chain transfer agent | (3-Mercaptopropyl)methyl-dimethoxysilane | 10.0 | 10.0 | | | | | 7.9 | 15.0 | | |
| | (3-Mercaptopropyl)trimethosysilane | | | | | 8.1 | 4.1 | | | 13.5 | 16.2 |
| | n-Dodecyl mercaptan | | | 8.9 | 8.9 | | 4.5 | | | | |
| Radical initiator | 2,2'-azobis(2-methyl-butyronitrile) | 0.35 | 0.35 | 2.70 | 0.35 | 2.80 | 2.80 | 2.70 | 0.35 | 0.35 | 0.35 |
| Solvent | Isobutyl alcohol | 8.0 | 19.8 | 28.7 | 7.9 | 29.3 | 29.6 | 28.7 | 8.0 | 7.3 | 7.2 |
| | | \multicolumn{10}{c}{Polymer properties} | | | | | | | | | |
| Number of terminally bonded silyl groups in polymer (B) | | 0.95 | 0.95 | 0.00 | 0.00 | 0.69 | 0.35 | 0.77 | 0.97 | 0.99 | 0.99 |
| Number of internally bonded silyl groups in polymer (B) | | 0.19 | 0.27 | 0.00 | 1.24 | 0.00 | 0.00 | 0.00 | 0.03 | 0.00 | 0.00 |

TABLE 1-continued

| Number-average molecular weight | 1900 | 1900 | 2000 | 2500 | 1850 | 1900 | 1950 | 1350 | 1650 | 1400 |
|---|---|---|---|---|---|---|---|---|---|---|
| Weight-average molecular weight | 3400 | 3350 | 3500 | 4400 | 3350 | 3300 | 3450 | 2400 | 2850 | 2450 |
| Solids concentration | 70% | 60% | 60% | 70% | 60% | 60% | 60% | 70% | 70% | 70% |

Synthesis Example 4-1

The polymer (A-1) obtained in Synthesis Example 2-1 and the isobutyl alcohol solution of the polymer (B-1) obtained in Synthesis Example 3-1 were mixed in a solids ratio (weight ratio) of 70/30. The resulting liquid mixture was heated to 110° C. using a rotary evaporator, and isobutyl alcohol was distilled off under reduced pressure. As a result, a polymer mixture having a solids concentration of 99% or more and a polymer (A-1)/polymer (B-1) weight ratio of 70/30 was obtained. The viscosity at 23° C. of this polymer mixture was 105 Pa·s.

Synthesis Examples 4-2 to 4-48

Polymer mixtures were produced from the polymers (A) and (B) in the same manner as the polymer mixture in Synthesis Example 4-1, except that the types of the polymers and the polymer proportions in the mixtures were as shown in Table 2. For these polymer mixtures, the values of the viscosity at 23° C. are shown in Table 2.

TABLE 2

| | Synthesis Example 4-1 | Synthesis Example 4-2 | Synthesis Example 4-3 | Synthesis Example 4-4 | Synthesis Example 4-5 | Synthesis Example 4-6 | Synthesis Example 4-7 | Synthesis Example 4-8 | Synthesis Example 4-9 | Synthesis Example 4-10 | Synthesis Example 4-11 | Synthesis Example 4-12 | Synthesis Example 4-13 | Synthesis Example 4-14 | Synthesis Example 4-15 | Synthesis Example 4-16 | Synthesis Example 4-17 |
|---|---|---|---|---|---|---|---|---|---|---|---|---|---|---|---|---|---|
| Polyoxyalkylene polymer (A) used | A-1 | A-1 | A-1 | A-2 | A-2 | A-2 | A-3 | A-3 | A-3 | A-4 | A-4 | A-4 | A-5 | A-5 | A-5 | A-1 | A-1 |
| Silyl group/backbone end number ratio in polymer (A) | 0.95 | 0.95 | 0.95 | 1.50 | 1.50 | 1.50 | 0.75 | 0.75 | 0.75 | 1.50 | 1.50 | 1.50 | 0.75 | 0.75 | 0.75 | 0.95 | 0.95 |
| (Meth)acrylic ester polymer (B) used | B-1 | B-2 | B-3 | B-1 | B-2 | B-3 | B-1 | B-2 | B-3 | B-4 | B-2 | B-3 | B-4 | B-2 | B-3 | B-5 | B-6 |
| Number of terminally bonded silyl groups in polymer (B) | 0.98 | 0.94 | 0.77 | 0.98 | 0.94 | 0.77 | 0.98 | 0.94 | 0.77 | 0.95 | 0.94 | 0.77 | 0.95 | 0.94 | 0.77 | 0.92 | 0.76 |
| Number of internally bonded silyl groups in polymer (B) | 0.00 | 0.46 | 0.46 | 0.00 | 0.46 | 0.46 | 0.00 | 0.46 | 0.46 | 0.04 | 0.46 | 0.46 | 0.04 | 0.46 | 0.46 | 0.04 | 0.83 |
| | | | | | | | | | Polymer proportions in mixture (parts by weight) | | | | | | | | |
| Polyoxyalkylene polymer (A) | 70 | 70 | 70 | 70 | 70 | 70 | 70 | 70 | 70 | 70 | 70 | 70 | 70 | 70 | 70 | 70 | 70 |
| (Meth)acrylic ester polymer (B) | 30 | 30 | 30 | 30 | 30 | 30 | 30 | 30 | 30 | 30 | 30 | 30 | 30 | 30 | 30 | 30 | 30 |

TABLE 2-continued

| Pa · s (23° C.) | Synthesis Example 4-18 | Synthesis Example 4-19 | Synthesis Example 4-20 | Synthesis Example 4-21 | Synthesis Example 4-22 | Synthesis Example 4-23 | Synthesis Example 4-24 | Synthesis Example 4-25 | Synthesis Example 4-26 | Synthesis Example 4-27 | Synthesis Example 4-28 | Synthesis Example 4-29 | Synthesis Example 4-30 | Synthesis Example 4-31 | Synthesis Example 4-32 | Synthesis Example 4-33 |
|---|---|---|---|---|---|---|---|---|---|---|---|---|---|---|---|---|
| Mixture viscosity | 105 | 105 | 95 | 140 | 125 | 120 | 125 | 120 | 105 | 110 | 115 | 100 | 100 | 100 | 100 | 95 |
| Polyoxyalkylene polymer (A) used | A-4 | A-4 | A-3 | A-3 | A-6 | A-6 | A-7 | A-7 | A-8 | A-8 | A-4 | A-4 | A-4 | A-4 | A-4 | A-4 |
| Silyl group/backbone end number ratio in polymer (A) | 1.50 | 1.50 | 0.75 | 0.75 | 0.80 | 0.80 | 1.50 | 1.50 | 0.90 | 0.90 | 1.50 | 1.50 | 1.50 | 1.50 | 1.50 | 1.50 |
| (Meth)acrylic ester polymer (B) used | B-5 | B-6 | B-5 | B-6 | B-4 | B-3 | B-1 | B-3 | B-4 | B-3 | B-7 | B-8 | B-9 | B-10 | B-11 | B42 |
| Number of terminally bonded silyl groups in polymer (B) | 0.92 | 0.76 | 0.92 | 0.76 | 0.95 | 0.77 | 0.98 | 0.77 | 0.95 | 0.77 | 0.94 | 0.97 | 0.98 | 0.95 | 0.95 | 0.95 |
| Number of internally bonded silyl groups in polymer (B) | 0.04 | 0.83 | 0.04 | 0.83 | 0.04 | 0.46 | 0.00 | 0.46 | 0.04 | 0.46 | 0.00 | 0.00 | 0.04 | 0.07 | 0.19 | 0.27 |
| Polymer proportions in mixture (parts by weight) | | | | | | | | | | | | | | | | |
| Polyoxyalkylene polymer (A) | 70 | 70 | 70 | 70 | 70 | 70 | 60 | 60 | 70 | 70 | 70 | 70 | 70 | 70 | 70 | 70 |
| (Meth)acrylic ester polymer (B) | 30 | 30 | 30 | 30 | 30 | 30 | 40 | 40 | 30 | 30 | 30 | 30 | 30 | 30 | 30 | 30 |

TABLE 2-continued

| | Synthesis Example 4-34 | Synthesis Example 4-35 | Synthesis Example 4-36 | Synthesis Example 4-37 | Synthesis Example 4-38 | Synthesis Example 4-39 | Synthesis Example 4-40 | Synthesis Example 4-41 | Synthesis Example 4-42 | Synthesis Example 4-43 | Synthesis Example 4-44 | Synthesis Example 4-45 | Synthesis Example 4-46 | Synthesis Example 4-47 | Synthesis Example 4-48 |
|---|---|---|---|---|---|---|---|---|---|---|---|---|---|---|---|
| Pa · s (23° C.) | 85 | 95 | 100 | 100 | 125 | 100 | 240 | 195 | 80 | 75 | 110 | 85 | 110 | 105 | 105 |
| | | | | | | | Mixture viscosity | | | | | | | | |
| Polyoxyalkylene polymer (A) used | A-4 | A-4 | A-4 | A-4 | A-9 | A-10 | A-11 | A-12 | A-13 | A-14 | A-4 | A-4 | A-4 | A-4 | A-4 |
| Silyl group/backbone end number ratio in polymer (A) | 1.50 | 1.50 | 1.50 | 1.50 | 0.95 | 1.60 | 0.95 | 0.95 | 0.95 | 0.85 | 1.50 | 1.50 | 1.50 | 1.50 | 1.50 |
| (Meth)acrylic ester polymer (B) used | B-13 | B-14 | B-15 | B-16 | B-17 | B-18 | B-9 | B-7 | B-10 | B-4 | B-19 | B-8 | B-4 | B-20 | B48 |
| Number of terminally bonded silyl groups in polymer (B) | 0.00 | 0.00 | 0.69 | 0.35 | 0.77 | 0.97 | 0.98 | 0.94 | 0.95 | 0.95 | 0.99 | 0.97 | 0.95 | 0.99 | 0.97 |
| Number of internally bonded silyl groups in polymer (B) | 0.00 | 1.24 | 0.00 | 0.00 | 0.00 | 0.03 | 0.04 | 0.00 | 0.07 | 0.04 | 0.00 | 0.00 | 0.04 | 0.00 | 0.03 |
| | | | | | | Polymer proportions in mixture (parts by weight) | | | | | | | | | |
| Polyoxyalkylene polymer (A) | 70 | 70 | 70 | 70 | 70 | 57 | 60 | 70 | 70 | 70 | 60 | 60 | 75 | 70 | 70 |
| (Meth)acrylic ester polymer (B) | 30 | 30 | 30 | 30 | 30 | 45 | 40 | 30 | 30 | 30 | 40 | 40 | 25 | 30 | 30 |
| | | | | | | | Mixture viscosity | | | | | | | | |
| Pa · s (23° C.) | 115 | 95 | 115 | 110 | 100 | 40 | 65 | 115 | 55 | 205 | 50 | 130 | 95 | 75 | 80 |

<Methods of Evaluating Composition Physical Properties>

Each of the polymer mixtures obtained in the synthesis examples was thoroughly mixed with some of the additives listed below, in particular the filler and anti-sagging agent, in the proportions shown in Tables 3 to 10. The resulting mixture was then passed through a three-roll paint mill three times to disperse the components to prepare a base material. Subsequently, a dehydration agent, an adhesion promoter, and a silanol condensation catalyst were added to and thoroughly mixed with the base material, and the mixture was kneaded and defoamed uniformly using a planetary mixer. In this manner, curable compositions were produced from the polymer mixtures. Each of the curable compositions produced was used to prepare specimens in a constant-temperature and humidity environment with a temperature of 23° C. and a relative humidity of 50%, and the specimens were subjected to evaluation procedures.

(Additives Used in Examples and Comparative Examples for Evaluation of Composition Physical Properties)

The additives listed below were used for evaluation of the composition physical properties in all of Examples and Comparative Examples. The amount of each additive added is shown as parts by weight per 100 parts by weight of the polymer mixture used as a base polymer.

Filler: (i) Fatty acid-treated precipitated calcium carbonate (HAKUENKA CCR, manufactured by Shiraishi Kogyo Kaisha, Ltd.), 50 parts by weight
 (ii) Heavy calcium carbonate (WHITON SB RED, manufactured by Shiraishi Calcium Kaisha, Ltd.), 50 parts by weight Anti-sagging agent: Fatty acid amide wax (DISPARLON #6500, manufactured by Kusumoto Chemicals, Ltd.), 0.5 parts by weight Dehydration agent: Vinyltrimethoxysilane (A-171, manufactured by Momentive Performance Materials Inc.), 3 parts by weight Adhesion promoter: 3-(N-2-aminoethylamino)propyltrimethoxysilane (A-1120, manufactured by Momentive Performance Materials Inc.), 3 parts by weight Silanol condensation catalyst: Any one of the following materials (the type and amount are shown in the tables)
 (iii) 50% solution of phenylguanidine (50 wt % N-butylbenzenesulfonamide solution, manufactured by Nippon Carbide Industries Co., Inc.)
 (iv) Dioctyltin dilaurate (U-810, manufactured by Nitto Kasei Co., Ltd.)
 (v) Dibutyltin bis(acetoacetate) (U-220H, manufactured by Nitto Kasei Co., Ltd.)

(Evaluation)

The curability and dumbbell physical properties of the produced curable compositions were measured by the methods described below. The results are also shown in Tables 3 to 10.

(Curability)

At a temperature of 23° C. and a relative humidity of 50%, an about 5-mm-thick mold frame was filled with the curable composition using a spatula, and the outer surface of the composition was flattened. The moment at which the surface flattening was completed was defined as the curing onset time point. The time taken for the composition to become non-adhesive to the spatula touching the outer surface of the composition was determined as the skinning time, based on which the curability was evaluated.

(Dumbbell Physical Properties)

A 3-mm-thick sheet-shaped mold frame was filled with the curable composition at a temperature of 23° C. and a relative humidity of 50%. The composition was cured at a temperature of 23° C. and a relative humidity of 50% for 3 days, after which the cured composition was aged in a dryer at 50° C. for 4 days to obtain a sheet-shaped cured product. The cured product obtained was punched to prepare a No. 3 dumbbell specimen according to JIS K 6251. The specimen prepared was subjected to tensile testing (tensile speed=200 mm/min), which was performed using Autograph at a temperature of 23° C. and a relative humidity of 50% to measure the stress at 50% elongation, stress at 100% elongation, stress at break, and elongation at break.

TABLE 3

| | | Example 1-1 | Comparative Example 1-1 | Comparative Example 1-2 | Example 1-2 | Comparative Example 1-3 | Comparative Example 1-4 | Comparative Example 1-5 | Comparative Example 1-6 | Comparative Example 1-7 |
|---|---|---|---|---|---|---|---|---|---|---|
| Synthesis Example No. of polymer mixture used | | 4-1 | 4-2 | 4-3 | 4-4 | 4-5 | 4-6 | 4-7 | 4-8 | 4-9 |
| Polyoxyalkylene polymer (A) used | | A-1 | A-1 | A-1 | A-2 | A-2 | A-2 | A-3 | A-3 | A-3 |
| Silyl group/backbone end number ratio in polymer (A) | | 0.95 | 0.95 | 0.95 | 1.50 | 1.50 | 1.50 | 0.75 | 0.75 | 0.75 |
| (Meth)acrylic ester polymer (B) used | | B-1 | B-2 | B-3 | B-1 | B-2 | B-3 | B-1 | B-2 | B-3 |
| Number of terminally bonded silyl groups in polymer (B) | | 0.98 | 0.94 | 0.77 | 0.98 | 0.94 | 0.77 | 0.98 | 0.94 | 0.77 |
| Number of internally bonded silyl groups in polymer (B) | | 0.00 | 0.46 | 0.46 | 0.00 | 0.46 | 0.46 | 0.00 | 0.46 | 0.46 |
| Composition component proportions (parts by weight) | | | | | | | | | | |
| Base polymer | Polyoxyalkylene polymer (A) | 70 | 70 | 70 | 70 | 70 | 70 | 70 | 70 | 70 |
| | (Meth)acrylic ester polymer (B) | 30 | 30 | 30 | 30 | 30 | 30 | 30 | 30 | 30 |
| Condensation catalyst | 50% solution of phenylguanidine | 0.5 | 0.5 | 0.5 | 0.5 | 0.5 | 0.5 | 0.5 | 0.5 | 0.5 |
| | Dioctyltin dilaurate | | | | | | | | | |
| | Dibutyltin bis(acetoacetate) | | | | | | | | | |

TABLE 3-continued

|  |  | Example 1-1 | Comparative Example 1-1 | Comparative Example 1-2 | Example 1-2 | Comparative Example 1-3 | Comparative Example 1-4 | Comparative Example 1-5 | Comparative Example 1-6 | Comparative Example 1-7 |
|---|---|---|---|---|---|---|---|---|---|---|
| Composition physical properties | | | | | | | | | | |
| Curability | Skinning time (min) | 45 | 40 | 45 | 20 | 20 | 20 | 40 | 30 | 30 |
| Dumbbell physical properties (No. 3 dumbbell specimen) | Stress at 50% elongation (MPa) | 0.4 | 1.2 | 0.9 | 0.4 | 1.0 | 0.7 | 0.1 | 0.7 | 0.5 |
| | Stress at 100% elongation (MPa) | 0.7 | 2.0 | 1.5 | 0.7 | 1.9 | 1.3 | 0.2 | 1.4 | 0.9 |
| | Stress at break (MPa) | 4.2 | 3.7 | 3.6 | 3.6 | 3.4 | 3.1 | 1.1 | 2.8 | 2.5 |
| | Elongation at break (%) | 1150 | 400 | 600 | 950 | 350 | 500 | 1150 | 300 | 500 |

TABLE 4

|  |  | Example 2-1 | Comparative Example 2-1 | Comparative Example 2-2 | Comparative Example 2-3 | Comparative Example 2-4 | Comparative Example 2-5 |
|---|---|---|---|---|---|---|---|
| Synthesis Example No. of polymer mixture used | | 4-10 | 4-11 | 4-12 | 4-13 | 4-14 | 4-15 |
| Polyoxyalkylene polymer (A) used | | A-4 | A-4 | A-4 | A-5 | A-5 | A-5 |
| Silyl group/backbone end number ratio in polymer (A) | | 1.50 | 1.50 | 1.50 | 0.75 | 0.75 | 0.75 |
| (Meth)acrylic ester polymer (B) used | | B-4 | B-2 | B-3 | B-4 | B-2 | B-3 |
| Number of terminally bonded silyl groups in polymer (B) | | 0.95 | 0.94 | 0.77 | 0.95 | 0.94 | 0.77 |
| Number of internally bonded silyl groups in polymer (B) | | 0.04 | 0.46 | 0.46 | 0.04 | 0.46 | 0.46 |
| Composition component proportions (parts by weight) | | | | | | | |
| Base polymer | Polyoxyalkylene polymer (A) | 70 | 70 | 70 | 70 | 70 | 70 |
| | (Meth)acrylic ester polymer (B) | 30 | 30 | 30 | 30 | 30 | 30 |
| Condensation catalyst | 50% solution of phenylguanidine | | | | | | |
| | Dioctyltin dilaurate | | | | | | |
| | Dibutyltin bis(acetoacetate) | 1 | 1 | 1 | 1 | 1 | 1 |
| Composition physical properties | | | | | | | |
| Curability | Skinning time (min) | 50 | 45 | 60 | 90 | 70 | 75 |
| Dumbbell physical properties (No. 3 dumbbell specimen) | Stress at 50% elongation (MPa) | 0.7 | 1.4 | 1.1 | 0.2 | 0.9 | 0.6 |
| | Stress at 100% elongation (MPa) | 1.1 | 2.3 | 1.9 | 0.3 | 1.6 | 0.9 |
| | Stress at break (MPa) | 5.1 | 3.8 | 4.0 | 2.1 | 3.3 | 2.7 |
| | Elongation at break (%) | 800 | 300 | 450 | 1150 | 400 | 600 |

TABLE 5

|  |  | Example 3-1 | Comparative Example 3-1 | Example 3-2 | Comparative Example 3-2 | Comparative Example 3-3 | Comparative Example 3-4 |
|---|---|---|---|---|---|---|---|
| Synthesis Example No. of polymer mixture used | | 4-16 | 4-17 | 4-18 | 4-19 | 4-20 | 4-21 |
| Polyoxyalkylene polymer (A) used | | A-1 | A-1 | A-4 | A-4 | A-3 | A-3 |
| Silyl group/backbone end number ratio in polymer (A) | | 0.95 | 0.95 | 1.50 | 1.50 | 0.75 | 0.75 |
| (Meth)acrylic ester polymer (B) used | | B-5 | B-6 | B-5 | B-6 | B-5 | B-6 |
| Number of terminally bonded silyl groups in polymer (B) | | 0.92 | 0.76 | 0.92 | 0.76 | 0.92 | 0.76 |
| Number of internally bonded silyl groups in polymer (B) | | 0.04 | 0.83 | 0.04 | 0.83 | 0.04 | 0.83 |
| Composition component proportions (parts by weight) | | | | | | | |
| Base polymer | Polyoxyalkylene polymer (A) | 70 | 70 | 70 | 70 | 70 | 70 |
| | (Meth)acrylic ester polymer (B) | 30 | 30 | 30 | 30 | 30 | 30 |
| Condensation catalyst | 50% solution of phenylguanidine | 0.5 | 0.5 | | | 0.5 | 0.5 |
| | Dioctyltin dilaurate | | | | | | |
| | Dibutyltin bis(acetoacetate) | | | 1 | 1 | | |

TABLE 5-continued

|  |  | Example 3-1 | Comparative Example 3-1 | Example 3-2 | Comparative Example 3-2 | Comparative Example 3-3 | Comparative Example 3-4 |
|---|---|---|---|---|---|---|---|
| Composition physical properties | | | | | | | |
| Curability | Skinning time (mm) | 50 | 35 | 30 | 10 | 40 | 30 |
| Dumbbell physical properties (No. 3 dumbbell specimen) | Stress at 50% elongation (MPa) | 0.7 | 2.0 | 1.0 | 3.2 | 0.3 | 1.5 |
| | Stress at 100% elongation (MPa) | 1.1 | 3.0 | 1.5 | 3.7 | 0.4 | 2.7 |
| | Stress at break (MPa) | 4.2 | 3.8 | 4.6 | 4.0 | 2.6 | 3.1 |
| | Elongation at break (%) | 800 | 200 | 700 | 150 | 900 | 150 |

TABLE 6

|  |  | Example 4-1 | Comparative Example 4-1 | Example 4-2 | Comparative Example 4-2 |
|---|---|---|---|---|---|
| Synthesis Example No. of polymer mixture used | | 4-22 | 4-23 | 4-24 | 4-25 |
| Polyoxyalkylene polymer (A) used | | A-6 | A-6 | A-7 | A-7 |
| Silyl group/backbone end number ratio in polymer (A) | | 0.80 | 0.80 | 1.50 | 1.50 |
| (Meth)acrylic ester polymer (B) used | | B-4 | B-3 | B-1 | B-3 |
| Number of terminally bonded silyl groups in polymer (B) | | 0.95 | 0.77 | 0.98 | 0.77 |
| Number of internally bonded silyl groups in polymer (B) | | 0.04 | 0.46 | 0.00 | 0.46 |
| Composition component proportions (parts by weight) | | | | | |
| Base polymer | Polyoxyalkylene polymer (A) | 70 | 70 | 60 | 60 |
| | (Meth)acrylic ester polymer (B) | 30 | 30 | 40 | 40 |
| Condensation catalyst | 50% solution of phenylguanidine | | | | |
| | Dioctyltin dilaurate | 0.4 | 0.4 | 0.5 | 0.5 |
| | Dibutyltin bis(acetoacetate) | | | | |
| Composition physical properties | | | | | |
| Curability | Skinning time (min) | 20 | 20 | 25 | 20 |
| Dumbbell physical properties (No. 3 dumbbell specimen) | Stress at 50% elongation (MPa) | 0.3 | 0.6 | 0.5 | 0.9 |
| | Stress at 100% elongation (MPa) | 0.5 | 1.0 | 0.9 | 1.7 |
| | Stress at break (MPa) | 3.2 | 2.9 | 5.7 | 4.4 |
| | Elongation at break (%) | 1000 | 550 | 800 | 500 |

TABLE 7

|  |  | Example 5-1 | Comparative Example 5-1 |
|---|---|---|---|
| Synthesis Example No. of polymer mixture used | | 4-26 | 4-27 |
| Polyoxyalkylene polymer (A) used | | A-8 | A-8 |
| Silyl group/backbone end number ratio in polymer (A) | | 0.90 | 0.90 |
| (Meth)acrylic ester polymer (B) used | | B-4 | B-3 |
| Number of terminally bonded silyl groups in polymer (B) | | 0.95 | 0.77 |
| Number of internally bonded silyl groups in polymer (B) | | 0.04 | 0.46 |
| Composition component proportions (parts by weight) | | | |
| Base polymer | Polyoxyalkylene polymer (A) | 70 | 70 |
| | (Meth)acrylic ester polymer (B) | 30 | 30 |
| Condensation catalyst | 50% solution of phenylguanidine | — | — |
| | Dioctyltin dilaurate | — | — |
| | Dibutyltin bis(acetoacetate) | — | — |
| Composition physical properties | | | |
| Curability | Skinning time (min) | 30 | 30 |
| Dumbbell physical properties (No. 3 dumbbell specimen) | Stress at 50% elongation (MPa) | 0.8 | 1.0 |
| | Stress at 100% elongation (MPa) | 1.2 | 1.6 |
| | Stress at break (MPa) | 4.2 | 2.8 |
| | Elongation at break (%) | 700 | 350 |

The results shown in Tables 3 to 7 demonstrate that both the stress at break and elongation at break were higher for the cured products of the compositions (Examples) containing polymer mixtures prepared by mixing polyoxyalkylene polymers (A) having a silyl group/backbone end number ratio of 0.80 or more with (meth)acrylic ester polymers (B) in which the number of terminally bonded silyl groups was from 0.30 to 1.00 and the number of internally bonded silyl groups was from 0 to less than 0.30 than for the cured products of the compositions (Comparative Examples 1-1, 1-2, 1-3, 1-4, 2-1, 2-2, 3-1, 3-2, 4-1, 4-2, and 5-1) containing polymer mixtures prepared by mixing the same polymers (A) with (meth)acrylic ester polymers in which the number of internally bonded silyl groups was 0.30 or more.

It is also seen that the elongation at break was higher but the stress at break was lower for the cured products of the compositions (Comparative Examples 1-5, 2-3, and 3-3) containing polymer mixtures prepared by mixing polyoxyalkylene polymers having a silyl group/backbone end number ratio of less than 0.80 with (meth)acrylic ester polymers (B) in which the number of terminally bonded silyl groups was from 0.30 to 1.00 and the number of internally bonded silyl groups was from 0 to less than 0.30 than for the cured products of the compositions (Comparative Examples 1-6, 1-7, 2-4, 2-5, and 3-4) containing polymer mixtures prepared by mixing the same polyoxyalkylene polymers with (meth)acrylic ester polymers in which the number of internally bonded silyl groups was 0.30 or more.

The above analysis leads to the conclusion that the increases in both stress at break and elongation at break provided by the use of the (meth)acrylic ester polymer (B), in which the number of terminally bonded silyl groups was from 0.30 to 1.00 and the number of internally bonded silyl groups was from 0 to less than 0.30, are characteristic of the case where the polymer (B) is used with the polyoxyalkylene polymer (A) having a silyl group/backbone end number ratio of 0.80 or more.

Referring to Table 6, comparison between Examples 4-1 and 4-2 reveals that the effect on the increase in stress at break is greater in the case where the silyl group/backbone end number ratio in the polymer (A) is 0.85 or more (Example 4-2) than in the case where the ratio is 0.80 (Example 4-1).

It is also seen that the effect of the (meth)acrylic ester polymer is greater in the case where the number of internally bonded silyl groups is less than 0.20 (Examples 6-1 to 6-6), much greater in the case where the number of internally bonded silyl groups is less than 0.15 (Examples 6-1 to 6-5), and still much greater in the case where the number of internally bonded silyl groups is less than 0.05 (Examples 6-1 to 6-4).

The results shown for Comparative Example 6-1 in Table 8 are those obtained when using a (meth)acrylic ester polymer in which both the number of terminally bonded silyl groups and the number of internally bonded silyl groups were 0. The results shown for Comparative Example 6-2 are those obtained when using a (meth)acrylic ester

TABLE 8

| | | Example 6-1 | Example 6-2 | Example 6-3 | Example 6-4 | Example 6-5 | Example 6-6 | Example 6-7 | Comparative Example 2-1 | Comparative Example 6-1 | Comparative Example 6-2 |
|---|---|---|---|---|---|---|---|---|---|---|---|
| Synthesis Example No. of polymer mixture used | | 4-28 | 4-29 | 4-30 | 4-10 | 4-31 | 4-32 | 4-33 | 4-11 | 4-34 | 4-35 |
| Polyoxyalkylene polymer (A) used | | A-4 | A-4 | A-4 | A-4 | A-4 | A-4 | A-4 | A-4 | A-4 | A-4 |
| Silyl group/backbone end number ratio in polymer (A) | | 1.50 | 1.50 | 1.50 | 1.50 | 1.50 | 1.50 | 1.50 | 1.50 | 1.50 | 1.50 |
| (Meth)acrylic ester polymer (B) used | | B-7 | B-8 | B-9 | B-4 | B-10 | B-11 | B-12 | B-2 | B-13 | B-14 |
| Number of terminally bonded silyl groups in polymer (B) | | 0.94 | 0.97 | 0.98 | 0.95 | 0.93 | 0.95 | 0.95 | 0.94 | 0.00 | 0.00 |
| Number of internally bonded silyl groups in polymer (B) | | 0.00 | 0.00 | 0.04 | 0.04 | 0.11 | 0.19 | 0.27 | 0.46 | 0.00 | 1.24 |
| Composition component proportions (parts by weight) | | | | | | | | | | | |
| Base polymer | Polyoxyalkylene polymer (A) | 70 | 70 | 70 | 70 | 70 | 70 | 70 | 70 | 70 | 70 |
| | (Meth)acrylic ester polymer (B) | 30 | 30 | 30 | 30 | 30 | 30 | 30 | 30 | 30 | 30 |
| Condensation catalyst | 50% solution of phenylguanidine Dioctyltin dilaurate | | | | | | | | | | |
| | Dibutyltin bis(acetoacetate) | 1 | 1 | 1 | 1 | 1 | 1 | 1 | 1 | 1 | 1 |
| Composition physical properties | | | | | | | | | | | |
| Curability | Skinning time (mm) | 45 | 70 | 55 | 50 | 50 | 60 | 65 | 45 | 65 | 60 |
| Dumbbell physical properties (No. 3 dumbbell specimen) | Stress at 50% elongation (MPa) | 0.8 | 0.7 | 0.7 | 0.7 | 0.8 | 0.9 | 1.0 | 1.4 | 0.8 | 1.2 |
| | Stress at 100% elongation (MPa) | 1.2 | 1.1 | 1.1 | 1.1 | 1.2 | 1.5 | 1.6 | 2.3 | 1.4 | 1.8 |
| | Stress at break (MPa) | 5.6 | 5.3 | 5.2 | 5.1 | 5.0 | 4.7 | 4.4 | 3.8 | 3.6 | 3.7 |
| | Elongation at break (%) | 750 | 800 | 850 | 800 | 750 | 650 | 600 | 300 | 600 | 400 |

The results shown in Table 8 are those obtained when using polymer mixtures prepared by mixing a polyoxyalkylene polymer (A) having a silyl group/backbone end number ratio of 1.50 with (meth)acrylic ester polymers (B) differing in the number of internally bonded silyl groups. The results demonstrate that the cured product exhibits a high stress at break and elongation at break in the case where the number of internally bonded silyl groups in the (meth)acrylic ester polymer is from 0 to less than 0.30 (Examples).

polymer in which the number of terminally bonded silyl groups was 0 and the number of internally bonded silyl groups was 1 or more. It is seen that in these comparative examples, both the stress at break and elongation at break of the cured products were low. This leads to the conclusion that the (meth)acrylic ester polymer needs to have reactive silyl groups bonded at ends of the polymer backbone in order to achieve the effect of one or more embodiments of the present invention.

TABLE 9

| | Example 6-1 | Example 7-1 | Example 7-2 | Comparative Example 6-1 | Compamtive Example 2-1 | Comparative Example 2-2 |
|---|---|---|---|---|---|---|
| Synthesis Example No. of polymer mixture used | 4-28 | 4-36 | 4-37 | 4-34 | 4-11 | 4-12 |
| Polyoxyalkylene polymer (A) used | A-4 | A-4 | A-4 | A-4 | A-4 | A-4 |
| Silyl group/backbone end number ratio in polymer (A) | 1.50 | 1.50 | 1.50 | 1.50 | 1.50 | 1.50 |
| (Meth)acrylic ester polymer (B) used | B-7 | B-15 | B-16 | B-13 | B-2 | B-3 |

TABLE 9-continued

|  | | Example 6-1 | Example 7-1 | Example 7-2 | Comparative Example 6-1 | Comparative Example 2-1 | Comparative Example 2-2 |
|---|---|---|---|---|---|---|---|
| Number of terminally bonded silyl groups in polymer (B) | | 0.94 | 0.69 | 0.35 | 0.00 | 0.94 | 0.77 |
| Number of internally bonded silyl groups in polymer (B) | | 0.00 | 0.00 | 0.00 | 0.00 | 0.46 | 0.46 |
| Composition component proportions (parts by weight) | | | | | | | |
| Base polymer | Polyoxyalkylene polymer (A) | 70 | 70 | 70 | 70 | 70 | 70 |
|  | (Meth)aclylic ester polymer (B) | 30 | 30 | 30 | 30 | 30 | 30 |
| Condensation catalyst | 50% solution of phenylguanidine | | | | | | |
|  | Dioctyltin dilaurate | | | | | | |
|  | Dibutyltinbis(acetoacetate) | 1 | 1 | 1 | 1 | 1 | 1 |
| Composition physical properties | | | | | | | |
| Curability | Skinning time (mm) | 45 | 45 | 60 | 65 | 45 | 60 |
| Dumbbell physical properties (No. 3 dumbbell specimen) | Stress at 50% elongation (MPa) | 0.8 | 0.7 | 0.7 | 0.8 | 1.4 | 1.1 |
|  | Stress at 100% elongation (MPa) | 1.2 | 1.2 | 1.1 | 1.4 | 2.3 | 1.9 |
|  | Stress at break (MPa) | 5.6 | 5.3 | 4.9 | 3.6 | 3.8 | 4.0 |
|  | Elongation at break (%) | 750 | 750 | 800 | 600 | 300 | 450 |

The results shown in Table 9 are those obtained when using polymer mixtures prepared by mixing a polyoxyalkylene polymer (A) having a silyl group/backbone end number ratio of 1.50 with (meth)acrylic ester polymers (B) in which the number of internally bonded silyl groups was less than 0.30 and which differed in the number of terminally bonded silyl groups. The results demonstrate that the cured product exhibits a high stress at break and elongation at break in the case where the number of terminally bonded silyl groups in the (meth)acrylic ester polymer is from 0.30 to 1.00 (Examples). It is also seen that the effect of the (meth)acrylic ester polymer is greater in the case where the number of terminally bonded silyl groups is 0.65 or more (Examples 6-1 and 7-1) and much greater in the case where the number of terminally bonded silyl groups is 0.85 or more (Example 6-1).

The results shown for Comparative Examples 2-1 and 2-2 in Table 8 are those obtained when using polymer mixtures prepared by mixing a polyoxyalkylene polymer (A) having a silyl group/backbone end number ratio of 1.50 with (meth)acrylic ester polymers in which the number of internally bonded silyl groups was 0.30 or more. For this case, it is seen that, despite the number of terminally bonded silyl groups being increased from less than 0.85 to not less than 0.85 as in the case of Examples 6-1 and 7-1, the stress at break of the cured product was not increased, but rather both the stress at break and elongation at break were reduced. This leads to the conclusion that the number of internally bonded silyl groups in the (meth)acrylic ester polymer needs to be less than 0.30 in order for the cured product to exhibit a high stress at break and elongation at break.

TABLE 10

|  | | Example 8-1 | Example 8-2 | Example 8-3 | Example 8-4 | Example 8-5 | Example 8-6 | Example 8-7 | Example 8-8 | Example 8-9 | Example 8-10 | Example 8-11 | Comparative Example 2-1 |
|---|---|---|---|---|---|---|---|---|---|---|---|---|---|
| Synthesis Example No. of polymer mixture used | | 4-38 | 4-39 | 4-40 | 4-41 | 4-42 | 4-43 | 4-44 | 4-45 | 4-46 | 4-47 | 4-48 | 4-11 |
| Polyoxyalkylene polymer (A) used | | A-9 | A-10 | A-11 | A-12 | A-13 | A-14 | A-4 | A-4 | A-4 | A-4 | A-4 | A-4 |
| Silyl group/backbone end number ratio in polymer (A) | | 0.95 | 1.60 | 0.95 | 0.95 | 0.95 | 0.85 | 1.50 | 1.50 | 1.50 | 1.50 | 1.50 | 1.50 |
| (Meth)acrylic ester polymer (B) used | | B-17 | B-18 | B-9 | B-7 | B-10 | B-4 | B-19 | B-8 | B-4 | B-20 | B-18 | B-2 |
| Number of terminally bonded silyl groups in polymer (B) | | 0.77 | 0.97 | 0.98 | 0.94 | 0.93 | 0.95 | 0.99 | 0.97 | 0.95 | 0.99 | 0.97 | 0.94 |
| Number of internally bonded silyl groups in polymer (B) | | 0.00 | 0.03 | 0.04 | 0.00 | 0.11 | 0.04 | 0.00 | 0.00 | 0.04 | 0.00 | 0.03 | 0.46 |
| Composition component proportions (parts by weight) | | | | | | | | | | | | | |
| Base polymer | Polyoxyalkylene polymer (A) | 70 | 57 | 60 | 70 | 70 | 70 | 60 | 60 | 75 | 70 | 70 | 70 |
|  | (Meth)aclylic ester polymer (B) | 30 | 43 | 40 | 30 | 30 | 30 | 40 | 40 | 25 | 30 | 30 | 30 |
| Condensation catalyst | 50% solution of phenylguanidine | 0.5 | | | | | | | | | | | |
|  | Dioctyltin dilaurate | | | | | | | 0.4 | | | | | |
|  | Dibutyltinbis(acetoacetate) | | 1 | 1 | 1 | 1 | | 1 | 1 | 1 | 1 | 1 | 1 |

TABLE 10-continued

| | | Example 8-1 | Example 8-2 | Example 8-3 | Example 8-4 | Example 8-5 | Example 8-6 | Example 8-7 | Example 8-8 | Example 8-9 | Example 8-10 | Example 8-11 | Comparative Example 2-1 |
|---|---|---|---|---|---|---|---|---|---|---|---|---|---|
| | | Composition physical properties | | | | | | | | | | | |
| Curability | Skinning time (min) | 30 | 80 | 90 | 150 | 65 | 10 | 155 | 75 | 50 | 85 | 70 | 45 |
| Dumbbell physical properties (No. 3 dumbbell specimen) | Stress at 50% elongation (MPa) | 0.8 | 0.6 | 0.8 | 0.7 | 0.7 | 0.8 | 0.4 | 0.6 | 0.7 | 0.7 | 0.5 | 1.4 |
| | Stress at 100% elongation (MPa) | 1.5 | 1.1 | 1.4 | 1.1 | 1.3 | 1.2 | 0.7 | 1.0 | 1.2 | 1.2 | 0.8 | 2.3 |
| | Stress at break (MPa) | 4.8 | 4.5 | 5.4 | 5.9 | 4.4 | 4.5 | 4.1 | 6.3 | 4.9 | 4.8 | 4.8 | 3.8 |
| | Elongation at break (%) | 650 | 650 | 650 | 800 | 700 | 650 | 900 | 850 | 850 | 750 | 950 | 300 |

The results shown in Table 10 are those obtained when using polymer mixtures prepared by mixing polyoxyalkylene polymers (A) having a silyl group/backbone end number ratio of 0.80 or more with different (meth)acrylic ester polymers (B) meeting the requirements of one or more embodiments of the present invention. It is seen that the cured product exhibited a higher stress at break and elongation at break in the case of using a (meth)acrylic ester polymer (B) in which the number of terminally bonded silyl groups was from 0.30 to 1.00 and the number of internally bonded silyl groups was from 0 to less than 0.30 (Examples) than in the case of using a (meth)acrylic ester polymer in which the number of internally bonded silyl groups was 0.30 or more (Comparative Example 2-1).

In all of Tables 3 to 10, the results of the skinning time measurement performed as the curability test reveal that the curable compositions meeting the requirements of one or more embodiments of the present invention had satisfactory curability.

The results discussed above demonstrate that when a composition contains a polymer mixture prepared by mixing a polyoxyalkylene polymer (A) having a silyl group/backbone end number ratio of 0.80 or more with a (meth)acrylic ester polymer (B) in which the number of terminally bonded silyl groups is from 0.30 to 1.00 and the number of internally bonded silyl groups is from 0 to less than 0.30, the composition can be suitably used as a curable composition the curing of which yields a cured product that exhibits a high stress at break and elongation at break.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:
1. A curable composition comprising:
a polyoxyalkylene polymer (A) having a reactive silyl group represented by the following formula (1):

$$—SiR^1_a X_{3-a} \quad (1),$$

wherein $R^1$ represents a substituted or unsubstituted hydrocarbon group having 1 to 20 carbon atoms, X represents a hydroxy group or a hydrolyzable group, and a is 0, 1, or 2, and wherein when there are two or more $R^1$ or X groups, the $R^1$ or X groups may be the same or different; and
a (meth)acrylic ester polymer (B) having a reactive silyl group represented by the following formula (2):

$$—SiR^2_b Y_{3-b} \quad (2),$$

wherein $R^2$ represents an unsubstituted hydrocarbon group having 1 to 20 carbon atoms, Y represents a hydroxy group or a hydrolyzable group, and b is 0, 1, or 2, and wherein when there are two or more $R^2$ or Y groups, the $R^2$ or Y groups may be the same or different, wherein in the polyoxyalkylene polymer (A), an average ratio per molecule of a number of reactive silyl groups to a number of ends of a polymer backbone is 0.80 or more, and wherein in the (meth)acrylic ester polymer (B), an average number per molecule of the reactive silyl groups bonded at ends of a polymer backbone is from 0.30 to 1.00, and an average number per molecule of the reactive silyl groups bonded inside the polymer backbone is from 0 to less than 0.30.

2. The curable composition according to claim 1, wherein in the polyoxyalkylene polymer (A), the average ratio per molecule of the number of the reactive silyl groups to the number of the ends of the polymer backbone is 0.85 or more.

3. The curable composition according to claim 1, wherein in the (meth)acrylic ester polymer (B), the average number per molecule of the reactive silyl groups bonded at the ends of the polymer backbone is from 0.85 to 1.00.

4. The curable composition according to claim 1, wherein in the (meth)acrylic ester polymer (B), the average number per molecule of the reactive silyl groups bonded inside the polymer backbone is from 0 to less than 0.15.

5. The curable composition according to claim 1, wherein a polyoxyalkylene polymer (A):(meth)acrylic ester polymer (B) weight ratio is from 80:20 to 50:50.

6. The curable composition according to claim 1, wherein a proportion of methyl methacrylate units in structural monomer units of the (meth)acrylic ester polymer (B) is from 35 to 85% by weight.

7. The curable composition according to claim 1, wherein a total proportion of alkyl methacrylate units in structural monomer units of the (meth)acrylic ester polymer (B) is from 70 to 85% by weight, and alkyl of the alkyl methacrylate units is an unsubstituted alkyl group having 1 to 4 carbon atoms.

8. A cured product produced by curing the curable composition according to claim 1.

* * * * *